US007571103B2

(12) United States Patent
Mizuki et al.

(10) Patent No.: US 7,571,103 B2
(45) Date of Patent: Aug. 4, 2009

(54) COMMAND PROCESSING APPARATUS AND PROGRAM PRODUCT EXECUTED THEREBY

(75) Inventors: Kiyoshi Mizuki, Kyoto (JP); Yoji Inagaki, Kyoto (JP); Yoshitaka Ajioka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 487 days.

(21) Appl. No.: 11/269,631

(22) Filed: Nov. 9, 2005

(65) Prior Publication Data
US 2006/0217986 A1 Sep. 28, 2006

(30) Foreign Application Priority Data
Feb. 23, 2005 (JP) ............... 2005-046418

(51) Int. Cl.
*G10L 21/00* (2006.01)
*A63F 9/24* (2006.01)
(52) U.S. Cl. ............... 704/275; 463/1; 463/23; 382/103
(58) Field of Classification Search ............ 704/275; 318/3; 463/1, 23; 382/103
See application file for complete search history.

(56) References Cited

U.S. PATENT DOCUMENTS

| 5,281,143 | A * | 1/1994 | Arad et al. ............... 434/185 |
| 5,493,185 | A * | 2/1996 | Mohr et al. ............... 318/3 |
| 5,604,855 | A * | 2/1997 | Crawford ............... 345/473 |
| 5,783,834 | A * | 7/1998 | Shatas ............... 250/559.33 |
| 5,788,508 | A * | 8/1998 | Lee et al. ............... 434/350 |
| 6,406,370 | B1 * | 6/2002 | Kumagai ............... 463/31 |
| 6,452,348 | B1 * | 9/2002 | Toyoda ............... 318/3 |
| 6,529,875 | B1 * | 3/2003 | Nakajima et al. ............... 704/275 |

(Continued)

FOREIGN PATENT DOCUMENTS

EP 1 254 688 11/2002

(Continued)

OTHER PUBLICATIONS

N. Kubota, Y. Nojima, N. Baba, F. Kojima, and T. Fukuda, "Evolving pet robot with emotional model," in Proc. of IEEE Congress on Evolutionary Computation, vol. 2, San Diego, CA, pp. 1231-1237, Jul. 2000.*

(Continued)

*Primary Examiner*—Talivaldis I Smits
*Assistant Examiner*—Greg A Borsetti
(74) *Attorney, Agent, or Firm*—Nixon & Vanderhye P.C.

(57) ABSTRACT

A command processing apparatus includes an LCD. A manual trick action instruction to a dog object displayed on the LCD is accepted through a touch panel. The dog object performs a trick according to the accepted trick action instruction. An arbitrary voice command is fetched by a microphone in relation to the trick action. A voice command being coincident with the fetched voice command is retrieved from among the registered voices in a RAM through a voice verification process by a CPU core. When the verification process fails, a verification result indicates "−1". The fetched voice command is assigned to the current trick. On the other hand, if the voice command found by the verification process is the voice command that is assigned to the current trick, a degree of relation corresponding to the trick is incremented. The dog object performs a different action depending on the degree of relation.

16 Claims, 18 Drawing Sheets

U.S. PATENT DOCUMENTS

| | | | |
|---|---|---|---|
| 6,538,666 B1 * | 3/2003 | Ozawa et al. | 715/728 |
| 6,554,679 B1 * | 4/2003 | Shackelford et al. | 446/268 |
| 2002/0183895 A1 * | 12/2002 | Kaplan et al. | 700/245 |
| 2003/0055653 A1 * | 3/2003 | Ishii et al. | 704/275 |
| 2003/0187653 A1 * | 10/2003 | Okubo et al. | 704/270 |
| 2004/0260563 A1 * | 12/2004 | Hashimoto et al. | 704/275 |
| 2005/0054401 A1 * | 3/2005 | Utsu | 463/1 |

FOREIGN PATENT DOCUMENTS

| | | |
|---|---|---|
| EP | 1 603 115 | 12/2005 |
| JP | 2000-181676 | 6/2000 |

OTHER PUBLICATIONS

Description of Petz Games. Retrieved Apr. 23, 2009 from http://www.angelfire.com/games5/compcritters/id20.htm.*

Stern, A.; Frank, A.; and Resner, B. 1998. Virtual Petz: A hybrid approach to creating autonomous, lifelike Dogz and Catz. In Proceedings of the Second International Conference on Autonomous Agents, 334-335. Menlo Park, Calif.: AAAI Press.*

Stern, A. 2002 (forthcoming). Virtual Babyz: Believable Agents with Narrative Intelligence. Forthcoming in M. Mates and P. Sengers (Eds.), Narrative Intelligence. Amsterdam: John Benjamins.*

Grand et al., 1996 Grand S., Cliff D., Malhotra A., 1996. Creatures: Artificial Life Autonomous Software Agents for Home Entertainment. University of Sussex Technical Report CSRP434.*

* cited by examiner

| No. | POSTURE | REGISTERED VOICE (POINTER) | DEGREE OF RELATION Lv |
|---|---|---|---|
| 0 | LIE-DOWN POSTURE | LIE DOWN | 2 |
| 1 | STANDING POSTURE | SIT UP | 3 |
| 2 | SITTING POSTURE | SIT DOWN | 1 |
| ⋮ | ⋮ | ⋮ | ⋮ |

(A) SITTING POSTURE (B) LIE-DOWN POSTURE (C) STANDING POSTURE (A) REGISTERED ENVELOPE OF "SIT UP"

(B) REGISTERED ENVELOPE OF "LIE DOWN"

(A) WHEN S=-1

(B) WHEN S=0

(C) WHEN S=+1

COMMAND PROCESSING APPARATUS AND PROGRAM PRODUCT EXECUTED THEREBY

CROSS REFERENCE OF RELATED APPLICATION

The disclosure of Japanese Patent Application No. 2005-46418 is incorporated herein by reference.

BACKGROUND

1. Field of the Technology

The technology presented herein relates to a command processing apparatus or a program product. More specifically, the technology relates to a command processing apparatus or a program product that is applied to a game apparatus, and executes a process corresponding to an input voice command.

2. Description of the Prior Art

One example of this kind of a conventional apparatus is disclosed in a patent reference 1 (Patent Laying-open No. 2000-181676). According to the prior art, when an emitted voice by a player is taken by a microphone, a word corresponding to the emitted voice is detected by a voice recognition unit. A behavior (action) of an object displayed on a screen is changed on the basis of the detected word. However, the prior art does not assume a fact that another action is set to the displayed object. Therefore, in the prior art, it is impossible to enjoy a process to teach the object to do the action.

SUMMARY

Therefore, it is a primary feature of an example embodiment presented herein to provide a novel command processing apparatus.

Another feature of the example embodiment is to provide a command processing apparatus capable of enjoying the procedure of teaching an object to perform an action.

The other feature of the example embodiment is to provide a program product capable of enjoying the procedure of teaching the object to perform an action.

A command processing apparatus according to the example embodiment comprises an accepting means, a first requesting means, a fetching means, a retrieving means, a first assigning means, an increasing means, and a first output means. The accepting means accepts a manual action instruction to the object. The first requesting means requests the object to perform an action corresponding to the action instruction accepted by the accepting means. The fetching means fetches an arbitrary voice command in association with the request by the first requesting means. The retrieving means retrieves a voice command being coincident with the voice command fetched by the fetching means from among the voice commands which are assigned to actions of the object.

The first assigning means assigns the voice command fetched by the fetching means to the action according to the request by the first requesting means when the retrieving means fails in the retrieving process. The increasing means increases a degree of relation indicating a highness in relevance between the action according to the request by the first requesting means and the voice command fetched by the fetching means when the voice command found by the retrieving means is the voice command which is assigned to the action according to the request by the first requesting means. The first output means outputs a different message depending on the degree of relation increased by the increasing means.

According to the example embodiment, the manual action instruction to the object is accepted by the accepting means (S3: reference numerals corresponding in this embodiment, and so forth). The action corresponding to the accepted action instruction is requested to the object by the first requesting means (S7). The arbitrary voice command is fetched by the fetching means (S17) in association with the request by the first requesting means. The retrieving means (S19) retrieves the voice command being coincident with the fetched voice command from among the voice commands that are assigned to the actions of the object.

When the retrieving means fails in the retrieving process, the fetched voice command is assigned to the action according to the request by the first requesting means by the assigning means (S31).

On the other hand, if the voice command retrieved by the retrieving means is the voice command assigned to the action according to the request by the first requesting means, the degree of relation indicating a highness in relevance between the action according to the request by the first requesting means and the voice command fetched by the fetching means is increased by the increasing means (S53). The output means (S57, S59) outputs a different message depending on the increased degree of relation.

Accordingly, when a manual action instruction is issued in order to teach the object to perform the trick, the object performs an action according to the instruction. Here, when an arbitrary voice command is issued, the voice command is assigned to the action performed by the object. When the same action instruction is issued again, and the same voice command in relation to execution of the action by the object is issued again, the degree of relation between the executed action and the issued voice command is increased. The output message is changed with the increase of the degree of relation. The change of the output message allows the player to enjoy the process of teaching the object to do the action.

The command processing apparatus according to the example embodiment further comprises a second requesting means to request the object to perform an action corresponding to the voice command. The second requesting means (S5) requests the object to perform the action corresponding to the voice command. After the assignment is thus completed, it is possible to perform an action according to the voice command.

The command processing apparatus according to the example embodiment further comprises a disabling means for disabling the fetching means when the degree of relation corresponding to the action according to the request by the first requesting means satisfies a first condition. When the degree of relation corresponding to the action according to the request by the first requesting means satisfies the condition, the fetching means fetches the disabling means. Thus, as to the action corresponding to the degree of relation satisfying the condition, changing the assignment of the voice command is prohibited.

In the command processing apparatus according to the example embodiment the increasing means increases a numerical value indicating the degree of relation, and the disabling means disables the fetching means when the numerical value indicating the degree of relation reaches a threshold value.

A command processing apparatus according to the example embodiment further comprises a determining means for determining whether or not the degree of relation corresponding to the action according to the request by the first requesting means indicates a default value when the retrieving means fails in the retrieving process; and a first decreasing means for decreasing the degree of relation noted by the determining means when the determination result by the determining means is negative, wherein the first assigning means suspends the assignment operation when the degree of relation noted by the determining means is larger than the default value.

When the retrieving means fails in the retrieving process, it is determined that whether or not the degree of relation corresponding to the action according to the request by the first requesting means indicates a default value by the determining means (S23). If the determination result by the determining means is negative, the degree of relation noted by the determining means is decreased by the first decreasing means (S27). The first assigning means suspends the assignment operation when the degree of relation noted by the determining means is larger than the default value. Thus, the assigned state of the voice command is changed by repeatedly issuing another voice command in association with the action to which the voice command is assigned.

A command processing apparatus according to the example embodiment further comprises a second decreasing means for decreasing the degree of relation corresponding to the voice command retrieved by the retrieving means when the voice command retrieved by the retrieving means is different from the voice command assigned to the action according to the request by the first requesting means; and a second assigning means for assigning the voice command fetched by the fetching means to the action according to the request by the first requesting means in place of the voice command retrieved by the retrieving means when the degree of relation decreased by the second decreasing means indicates the default value.

If the voice command found by the retrieving means is different from the voice command assigned to the action according to the request by the first requesting means, the degree of relation corresponding to the voice command found by the retrieving means is decreased by the second decreasing means (S43). The second assigning means (S49), when the decreased degree of relation indicates the default value, assigns the voice command fetched by the fetching means in place of the voice command found by the retrieving means to the action according to the request by the first requesting means. Thus, it is possible to assign the voice command assigned to one action to another action again.

A command processing apparatus according to the example embodiment further comprises a second output means for outputting a message as to the decrease of the degree of relation. The second output means (S25, S41) outputs a message in relation to the decrease of the degree of relation.

The above described features, aspects and advantages of the example embodiment presented herein will become more apparent from the following detailed description of the present invention when taken in conjunction with the accompanying drawings.

BRIEF DESCRIPTION OF THE DRAWINGS

FIG. 4 is an illustrative view showing one example of a configuration of a table to be applied to FIG. 1 embodiment;

DETAILED DESCRIPTION OF THE PREFERRED EMBODIMENTS

Figure 1:
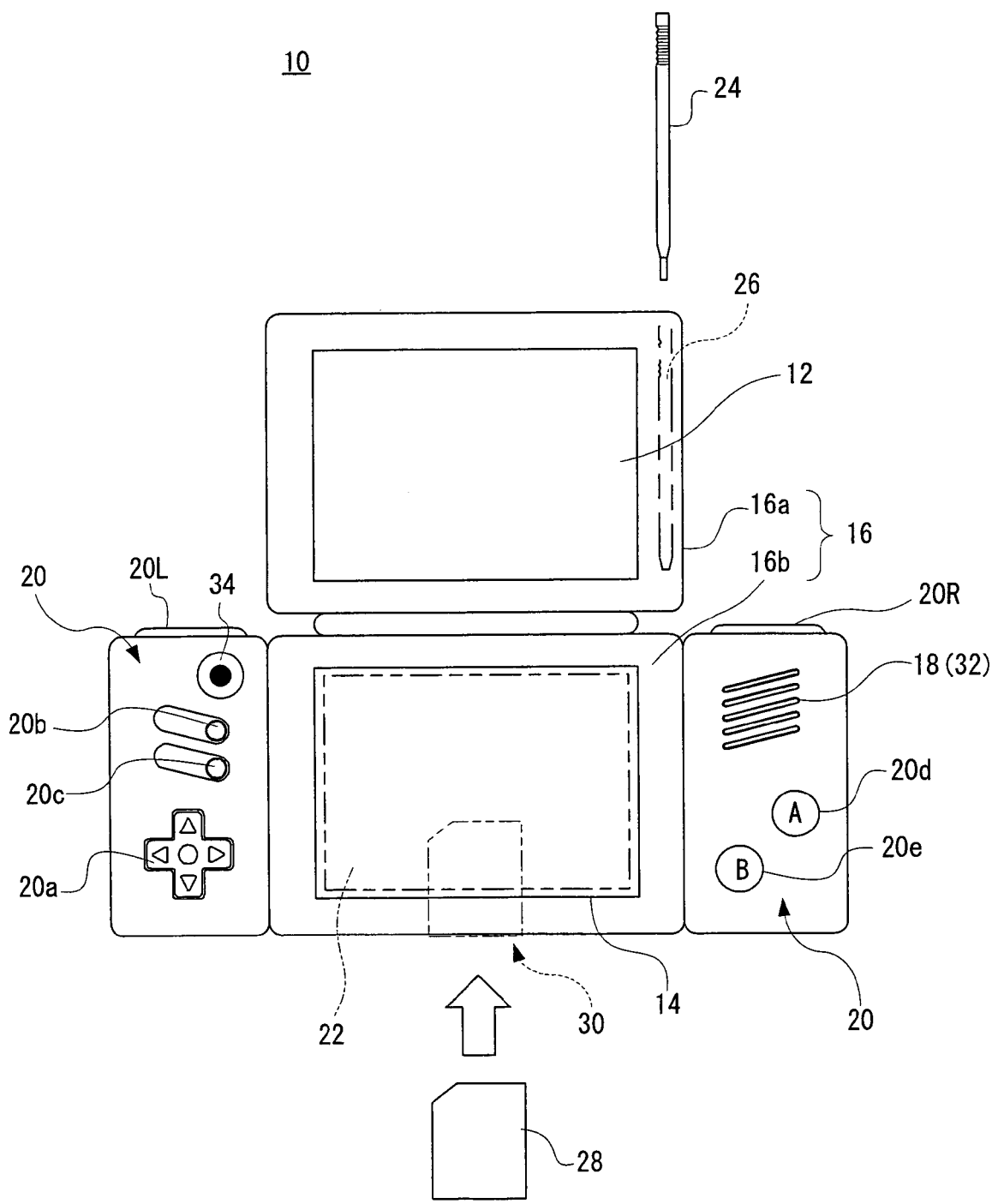
FIG. 1 is an illustrative view showing appearance of one embodiment.

Referring to FIG. 1, a game apparatus 10 of one embodiment of this invention includes LCDs (liquid crystal display) 12 and 14. The LCDs 12 and 14 are provided on a housing 16 so as to be arranged in a predetermined position. In this embodiment, the housing 16 includes an upper housing 16a and a lower housing 16b. The LCD 12 is provided on the upper housing 16a while the LCD 14 is provided on the lower housing 16b. Accordingly, the LCDs 12 and 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surfaces of the LCDs 12 and 14 from being damaged. It is noted that in place of rotatably connecting the upper housing 16a and the lower housing 16b with each other, the upper housing 16a and the lower housing 16b may integrally be formed.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed of a push button, and is utilized for starting (restarting), temporarily stopping (pausing) a game, and so forth. The select switch 20c is formed of the push button, and utilized for a game mode selection, etc.

The action switch 20d, that is, the A button is formed of the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed of the push button, and is utilized for changing a game mode selected by the select switch 20c, canceling an action determined by the A button 20d, and so forth.

The action switch (L button) 20L and the action switch (R button) 20R are formed of the push button, and the L button 20L and the R button (R button) 20R can be utilized for the same operation as the A button 20d and the B button 20e, and can also be utilized for an operation of a subsidiary of the A button 20d and the B button 20e.

Also, the game apparatus 10 is a game apparatus with the use of a touch panel, and the touch panel 22 is provided on a top surface of the LCD 14. As the touch panel 22, any one of a resistance film system, an optical system (infrared rays system), and an electrostatic capacitive coupling system can be utilized. In response to an operation by depressing, stroking (touching), and so forth with a stick 24 such as stylus pen, or a finger (hereinafter, referred to as "stick 24, etc.") on a top surface of the touch panel 22, the touch panel 22 detects a coordinates position of the stick 24, etc. to output coordinates position data.

It is noted that in this embodiment, a resolution of the display surface of the LCD 14 is 256 dots×192 dots (this is true for the LCD 12), and a detection accuracy of the touch panel 22 is also rendered 256 dots×192 dots in correspondence to the resolution of the display surface. However, the detection accuracy of the touch panel 22 may be lower than the resolution of the display surface, or higher than it.

In this embodiment, a game screen to be viewed by the player is displayed on the LCD 12, and a game screen to be viewed and operated by the player in association with the game screen of the LCD 12 is displayed on the LCD 14. Here, the game screen to be displayed on the LCD 14 includes an object, an icon, text information, etc. operable (touchable) by the stick, etc. The player directly touches the object displayed on the LCD 14 by the stick 24, etc. to thereby perform the object selection, the coordinates input, etc.

Also, it is possible to instruct other various inputs depending on the kind of the game. For example, it is possible to select texture information and a command icon displayed on the display screen of the LCD 14, and instruct a scrolling direction of the game screen (map) displayed on the LCD 12.

Thus, the game apparatus 10 has the LCD 12 and the LCD 14 as a display portion of two screens, the touch panel 22 is provided on the display screen of the LCD 14, and the operating switch 20 is provided on the lower housing 16b. That is, the game apparatus 10 has two screens (LCD 12, 14) and two systems of the operating portions (20, 22).

Furthermore, in this embodiment, the stick 24 can be inserted into a housing portion 26 provided in proximity to a right side surface of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. A connector 46 (see FIG. 2) is provided at a depth portion of the loading slot 30 for connecting a connector (not shown) provided at an end portion of the memory card 28 in the loading direction. Therefore, when the memory card 28 is loaded into the loading slot 30, the connectors are connected with each other, and the memory card 28 is accessible by a CPU core 42 (see FIG. 2) of the game apparatus 10.

A microphone 34 for fetching a sound is provided at the right side of the LCD 14, and a speaker 32 (see FIG. 2) is provided at a position corresponding to the sound hole 18 inside the lower housing 16b.

Furthermore although omitted in FIG. 1, for example, a battery accommodating box is provided on a rear surface of the lower housing 16b. A power switch, a volume switch, an external expansion connector, an earphone jack, etc. are provided on a bottom surface of the lower housing 16b.

Figure 2:
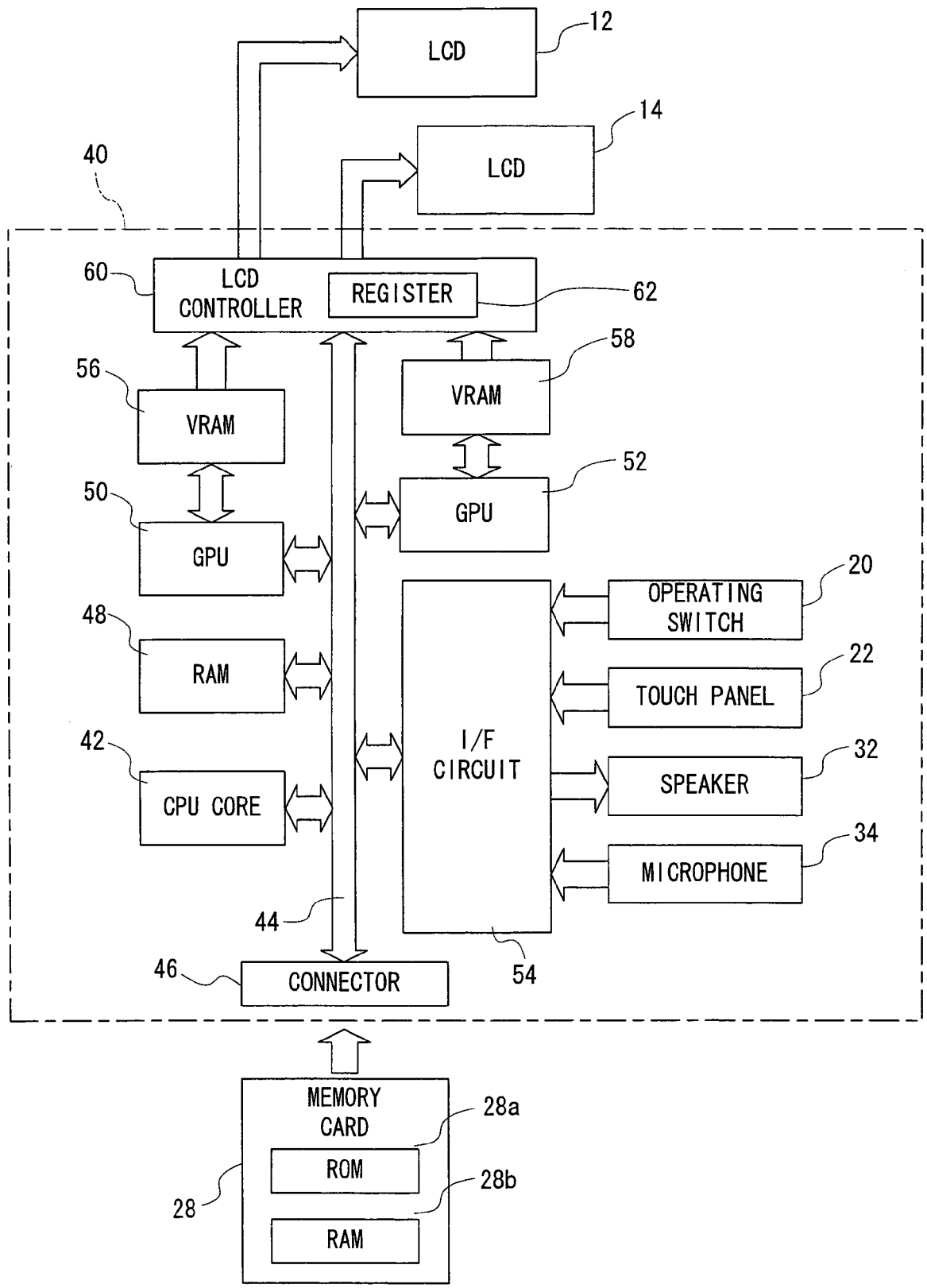
FIG. 2 is a block diagram showing one example of an internal configuration of FIG. 1 embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as the CPU core 42, etc. is mounted. The CPU core 42 is connected to the connector 46, a RAM 48, a GPU (Graphics Processing Unit) 50, a GPU 52, an I/F circuit 54, and an LCD controller 60 via a bus 44.

The connector 46 is detachably connected with the memory card 28 as described above. The memory card 28 includes a ROM 28a and a RAM 28b. Although illustration is omitted, the ROM 28a and the RAM 28b are connected with each other via a bus, and also connected with a connector (not shown) to be connected with the connector 46. Accordingly, the CPU core 42 gains access to the ROM 28a and the RAM 28b.

The ROM 28a stores in advance a game program for a game to be executed by the game apparatus 10, image data such as a character image, a background image, an item image, a message image, etc., and sound data such as an effective sound, a BGM, an onomatopoeic sound of the character, etc. The backup RAM 28b saves proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 stores in the RAM 48 temporary data such as game data, flag data, etc. in correspondence with progress of the game.

It is noted that such the game program, the image data, the sound data, etc. are read from the ROM 28a entirely at a time, or partially and sequentially so as to be stored into the RAM 48.

Each of the GPU 50 and the GPU 52 forms a part of a rendering means, is constructed by, for example, a single chip ASIC. The GPU 50 or 52 receives a graphics command (construction command) from the CPU core 42 to generate game image data according to the graphics command. Here, the CPU core 42 applies to each of the GPU 50 and the GPU 52 an image generating program (included in the game program) necessary for generating the game image data in addition to the graphics command.

It is noted that data (image data such as a polygon, a texture, etc.) necessary for executing the graphics command is stored in the RAM 48, and obtained by the GPU 50 or 52.

Furthermore, the GPU 50 is connected with a VRAM 56, and the GPU 52 is connected with a VRAM 58. The GPU 50 renders the created game image data in the VRAM 56, and the GPU 52 renders the created game image data in the VRAM 58.

The VRAM 56 and 58 are connected to the LCD controller 60. The LCD controller 60 includes a register 62. The register 62 includes one bit, for example, and stores a data value of "0" or "1" according to an instruction of the CPU core 42. The LCD controller 60 outputs the game image data rendered in the VRAM 56 to the LCD 12, and outputs the game image data rendered in the VRAM 58 to the LCD 14 in a case that the data value of the register 62 is "0". Furthermore, the LCD controller 60 outputs the game image data rendered in the VRAM 56 to the LCD 14, and outputs the game image data rendered in the VRAM 58 to the LCD 12 in a case that the data value of the register 62 is "1".

The I/F circuit 54 is connected with the operating switch 20, the touch panel 22, the speaker 32, and the microphone 34. Here, the operating switch 20 is the above-described switches 20a, 20b, 20c, 20d, 20e, 20L and 20R. When the operating switch 20 is operated, a corresponding operation signal (operation data) is input to the CPU core 42 via the I/F circuit 54. Furthermore, the coordinates data detected from the touch panel 22, the sound data fetched by the microphone 34 are also input to the CPU core 42 via the I/F circuit 54. In addition, the CPU core 42 reads the sound data necessary for the game such as a BGM, a sound effect, an onomatopoeic sound of the game character, etc. from the RAM 48, and outputs it from the speaker 32 via the I/F circuit 54.

Figure 3:
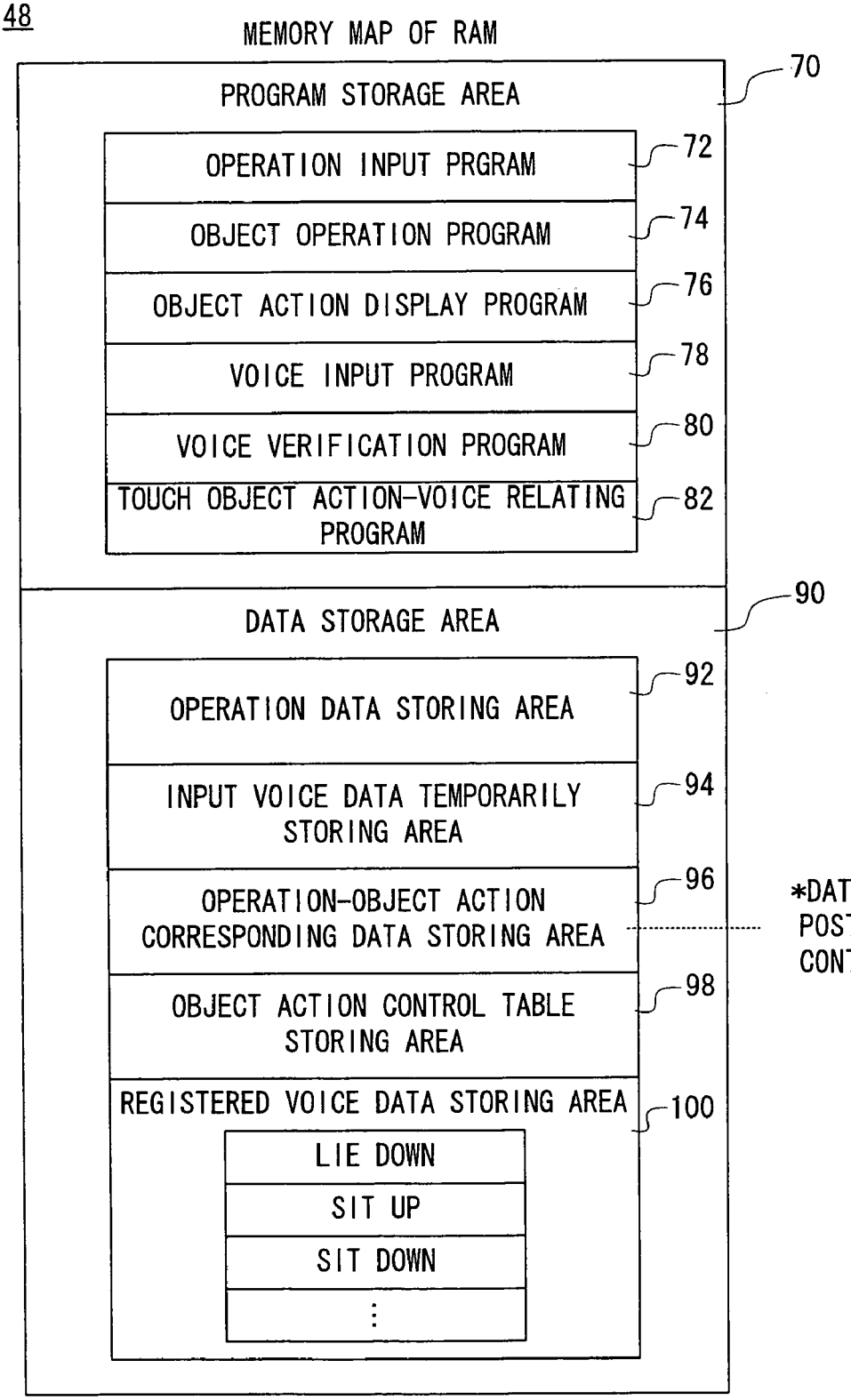
FIG. 3 is an illustrative view showing a mapping state of a RAM to be applied to FIG. 1 embodiment.

FIG. 3 shows one example of a memory map of the RAM 48. The RAM 48 includes a program storage area 70 for storing programs loaded from the ROM 28a of the memory card 28. The loaded programs include an operation input program 72, an object operation program 74, an object action display program 76, a voice input program 78, a voice verification program 80, a touch object action-voice relating program 82, etc.

It is noted that in the program storage area 70, although illustration is omitted, other various programs required to proceed the game such as a program to generate/output a game image and a game voice are stored.

The operation input program is a program for inputting an operation by a player through a key or a touch panel. The object operation program is a program for operating an object in response to an operation input by an operation input program. The object action display program is a program for displaying an object in a manner according to the operation by the object operation program.

Figure 13:
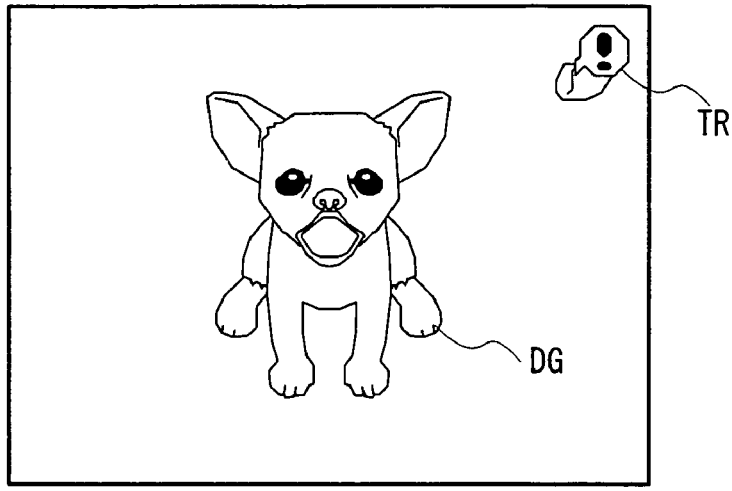
FIG. 13(A) is an illustrative view showing one example of a dog object to be displayed on a screen.
FIG. 13(B) is an illustrative view showing another example of the dog object to be displayed on a screen.
FIG. 13(C) is an illustrative view showing the other example of the dog object to be displayed on a screen.
Figure 13:
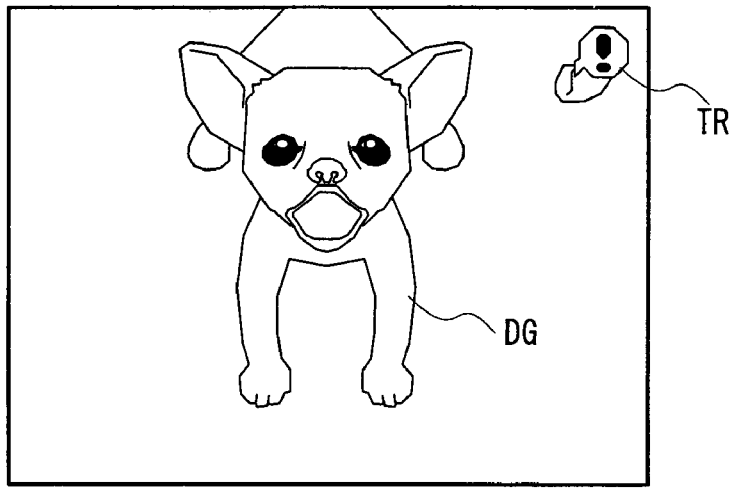
Figure 13:
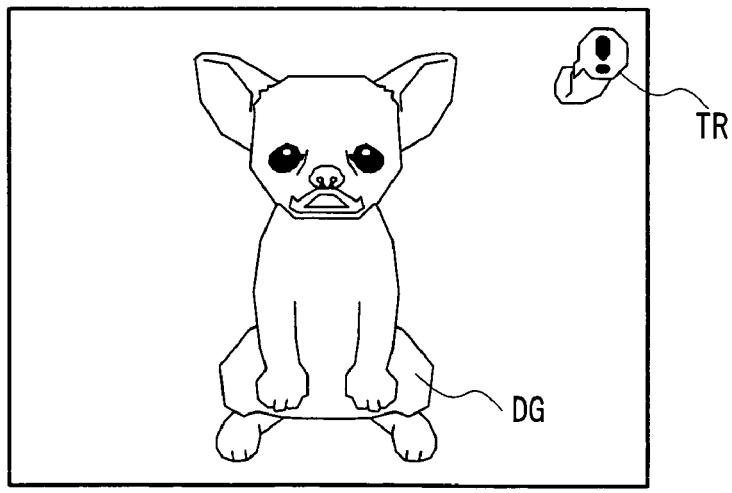

In this embodiment, a dog object DG is displayed on the LCD 12 in a manner shown in FIG. 13(A), FIG. 13(B) or FIG. 13(C) by executing the object action display program for performing a display process of the object with various postures set in advance. More specifically, three-dimensional graphics rendering data (not illustrated) originally stored in the ROM 28a and construction of the dog object is rendered in the virtual three-dimensional game space according to a transformation procedure (not illustrated) of the display control data such as corresponding coordinate data when a predetermined operation input is present. For example, FIG. 13(A) shows a display state of a sitting posture, FIG. 13(B) shows a display state of a lie-down posture, and FIG. 13(C) shows a display state of a standing posture. It is noted that in this embodiment, a "posture" is synonymous with a "trick".

The voice input program 78 is a program for inputting a voice generated by the player through the microphone 34, and the voice verification program 78 is a program for verifying the input voice against the registered voice. The touch object action-voice relating program is a program for relating to a desired input voice into a process for displaying an object defined by an operation of the stick 24 in various postures decided in advance. Furthermore, the RAM 48 includes a data storage area 90. The data storage area 90 has an operation data storing area 92, an input voice data temporarily storing area 94, an operation-object action corresponding data storing area 96, an object action control table storing area 98, and a registered voice data storing area 100.

The operation data storing area 92 temporarily stores data according to the operation of the operating switch 20 and the stick 24. More specifically, data indicative of which operating switch 20 is depressed is temporarily stored, or input coordinates and change of coordinates indicative of how the stick 24 touches the touch panel 22 are temporarily stored. The input voice data temporarily storing area 94 temporarily stores envelope data of the input voice by the voice input program 76.

The object action control table storing area 98 is an area to store a table 98t (see FIG. 4) for controlling an association between the input voice and the object. The registered voice data storing area 100 is an area to store a voice satisfying a condition by the touch object action-voice relating program out of the input voices as the registered voice.

Referring to FIG. 4, as to the table 98t, a plurality of identification numbers are assigned to a plurality of posture displays. For example, the identification number "0" is assigned to the display of the lie-down posture, the identification number "1" is assigned to the display of the standing posture, and the identification number "2" is assigned to the display of the sitting posture.

When the voice data corresponding to the voice of "lie down" is input at a time that the dog object DG displayed on the LCD 12 takes a lie-down posture, for example, the input voice data is stored in the registered voice data storing area 100, and the pointer pointing the registered voice of "lie down" is assigned to the identification number of "0". Similarly, when the voice of "sit up" is input as data at a time that the displayed dog object DG takes the standing posture, the input voice is stored in the registered voice data storing area 100, and further the pointer pointing the registered voice of "sit up" is assigned to the identification number of "1". A degree of relation Lv is a variable indicative of a highness in relation between the registered voice and the posture, and shows any one of values "0"-"3".

A description is made on a processing operation of the CPU core 42 when a game play is performed in the game apparatus 10 by utilizing FIG. 5-FIG. 12. First, referring to FIG. 5, in a step S1, an initialization setting of the game is performed. That is, initialization of the touch panel, setting the default value of the operating switch, or initialization of flags to be utilized in the various game processing is performed to make preparation for the game processing. In a succeeding step S3, it is determined whether or not an instruction to make the object to perform a predetermined trick action with the stick 24 is generated, that is, it is determined whether or not the trick action instruction is generated. If "NO" here, another game processing is performed in a step S5, and then, the process returns to the step S3.

If "YES" in the step S3, a trick action process for performing the trick action display of the object set in advance in response to the input by the stick is executed in a step S7. The trick action processing making the object perform the trick action display on the basis the voice input rather than the operation input is executed in the step S5. In a step S9, the degree of relation Lv assigned to the corresponding trick action display (instructed trick) is detected from the table 98t shown in FIG. 4, and it is determined whether or not the detected degree of relation Lv is "3". If "YES" here, the process returns to the step S3. On the other hand, if "NO", a trick button TR for guiding that the voice registration is capable is displayed on the screen in a manner shown in FIG. 13(A), FIG. 13(B) or FIG. 13(C).

In a step S13, it is determined whether or not the trick button TR is operated by the stick 24, and in a step S15, it is determined whether or not another button operation is performed. When the other button is operated, the process returns to the step S3, and when the trick button TR is operated, the process proceeds to the process in a step S17 and following.

In the step S17, a voice input process is executed, and in a step S19, a voice verification process is executed. The envelope data of the voice command input through the microphone 34 by the voice input process is created in the input voice data temporarily storing area 94 shown in FIG. 3. Furthermore, the input voice is compared to all the registered voices stored in the registered voice data storing area 100 by the voice verification process.

In a step S21, it is determined whether or not the verification result is "−1". When the registered voice being coincident with the input voice is detected, the verification result shows the identification number of the posture control (action display) of the object to which the registered voice is assigned. On the other hand, if the registered voice being coincident with the input voice is not detected, the verification result indicates "−1".

If the verification result is "−1", it is determined whether or not the degree of relation Lv assigned to the instructed trick is "0" in a step S23. If "YES" here, the process proceeds to a step S31, the input voice is moved from the input voice data temporarily storing area 94 to the registered voice data storing area, and the moved input voice, that is, the pointer pointing the registered voice is assigned to the instructed trick. In a step S33, the degree of relation Lv assigned to the instructed trick is set to "1", and then, the process returns to the step S3.

If "NO" in the step S23, a display process of an action such as the object being confused is executed in a step S25. By the confused action process, a question mark, for example, is displayed above the dog object DG. In a step S27, the degree of relation Lv assigned to the instructed trick is decremented, and in a step S29, it is determined whether or not the updated degree of relation Lv is "0". If "NO" here, the process directly returns to the step S3, and if "YES", the process proceeds to the steps S31 and S33, and then returns to the step S3.

If the verification result indicates a numerical value equal to or more than "0", the process proceeds from the step S21 to step S35 to determine whether or not the numerical value indicated by the verification result is coincident with the identification number of the trick having the degree of relation Lv of "3". If "YES" here, the process proceeds to the step S37, a trick action process (display process for allowing the object to perform a corresponding trick action) as to the trick having the coincident identification number of the trick is executed. Then, the process returns to the step S3.

If "NO" in the step S35, it is determined whether or not the numerical value indicated by the verification result is coincident with the identification number of the instructed trick in a step S39. If "YES" here, the process proceeds to a step S53 to increment the degree of relation Lv assigned to the instructed trick. It is determined whether or not the updated degree of relation Lv indicates "3" in a step S55, and if "NO", a once-nodding-action process is executed in a step S59 while if "YES", a twice-nodding-action process is executed in a step S57. When the once-nodding-action process is performed, an action display is performed such that the dog object DG on the screen gives out "woof". When the twice-nodding-action process is performed, an action display is performed such that the dog object DG on the screen gives out "woof, woof". After completion of the process in the step S57 or S59, the process returns to the step S3.

If "NO" in the step S39, a confused action process is executed in a step S41. A question mark is displayed above the dog object DG. In a step S43, the degree of relation Lv assigned to the trick corresponding to the verification result is decremented, and in a step S45, it is determined whether or not the updated degree of relation Lv is "0". If "NO" here, the process directly returns to the step S3 while if "YES", the process in steps S47-S51 is performed, and then, the process returns to the step S3.

In the step S47, assigning the registered voice to the trick corresponding to the verification result is canceled. In the step S49, a voice registration process similar to the step S31 as to the instructed trick is performed. In the step S51, the degree of relation Lv assigned to the instructed trick is set to "1".

When a voice input is performed in a state that the degree of relation Lv of the lie-down posture indicates "0", the degree of relation Lv of the standing posture indicates "3", and the degree of relation Lv of the sitting posture indicates "0" out of the trick to be displayed, a series of processes is executed as follows.

When the player makes the dog object DG stand by operating the stick 24, since the degree of relation Lv assigned to the standing posture is "3", the process returns from the step S9 to the step S3. That is, it is impossible to change the voice registration as to the posture indicative of the degree of relation Lv of "3".

When the player makes the dog object DG lie down by operating the stick 24, and actually inputs the voice of "lie down" through the operation of the trick button TR, since the voice of "lie down" is not registered, the verification result indicates "−1". Furthermore, since the degree of relation Lv assigned to the lie-down posture is "0", the process proceeds to the step S31 through the steps S21 and S23. Consequently, the input voice of "lie down" is registered, and the pointer pointing the registered voice of "lie down" is assigned to the trick action display of the lie-down posture. The degree of relation Lv assigned to the lie-down posture is set to "1" by the process in the step S33.

When the player makes the dog object DG lie down again by operating the stick 24, and inputs again the voice of "lie down" through the operation of the trick buttons TR, since the voice of "lie down" has been registered, the verification result indicates "0". The process proceeds to a step S53 through the steps S21, S35 and S39, and the degree of relation Lv assigned to the lie-down posture is updated from "1" to "2". The process proceeds to a step S59 through a step S55, and consequently, an action display process of making the dog object DG barks once such as "woof" is performed.

When the player repeats the same operation, the degree of relation Lv is updated from "2" to "3", and the dog object DG barks twice such as "woof, woof". The updating of the degree of relation Lv to "3" prevents the voice registered in the lie-down posture from being changed.

It is noted that when the player makes the dog object DG lie down by operation the stick 24, and inputs an actual voice of "please lie down" through the operation of the trick buttons TR in a state that the degree of relation Lv assigned to the lie-down posture indicates "2", the verification result becomes "−1". It is noted that since the degree of relation Lv assigned to the lie-down posture is "2", the process proceeds to a step S25 through the steps S21 and S23. A question mark is displayed above the dog object DG, and then, the degree of relation Lv assigned to the lie-down posture is updated from "2" to When the player repeats the same operation in order to input the voice of "please lie down" again, the question mark is displayed above the dog object DG, and the degree of relation Lv assigned to the lie-down posture is updated from "1" to "0". At this time, the process proceeds from the step S29 to the step S31. In the registered voice data storing area, the voice of "please lie down" is registered, and the pointing destination assigned to the lie-down posture is updated from the registered voice of "lie down" to the registered voice of "please lie down". The degree of relation Lv assigned to the lie-down posture is updated from "0" to "1".

When the player makes the dog object DG sit down by operating the stick 24, and inputs the voice of "please lie down" through the operation of the trick button in this state, the verification result indicates "0". The numerical value is different from the identification number "3" of the sitting posture, and therefore, the process proceeds to the step S41 through the steps S21, S35 and S39.

The question mark is displayed above the dog object DG, and then, the degree of relation Lv assigned to the lie-down posture is updated from "1" to "0" by the process in a step S43. Since the updated degree of relation Lv is "0", "YES" is determined in a step S45, and assignment of the registered voice to the lie-down posture is canceled in a step S47. In addition, the registered voice of "please lie down" is assigned to the sitting posture by the process in a step S49, and the degree of relation Lv assigned to the sitting posture is set to "1".

Figure 8:
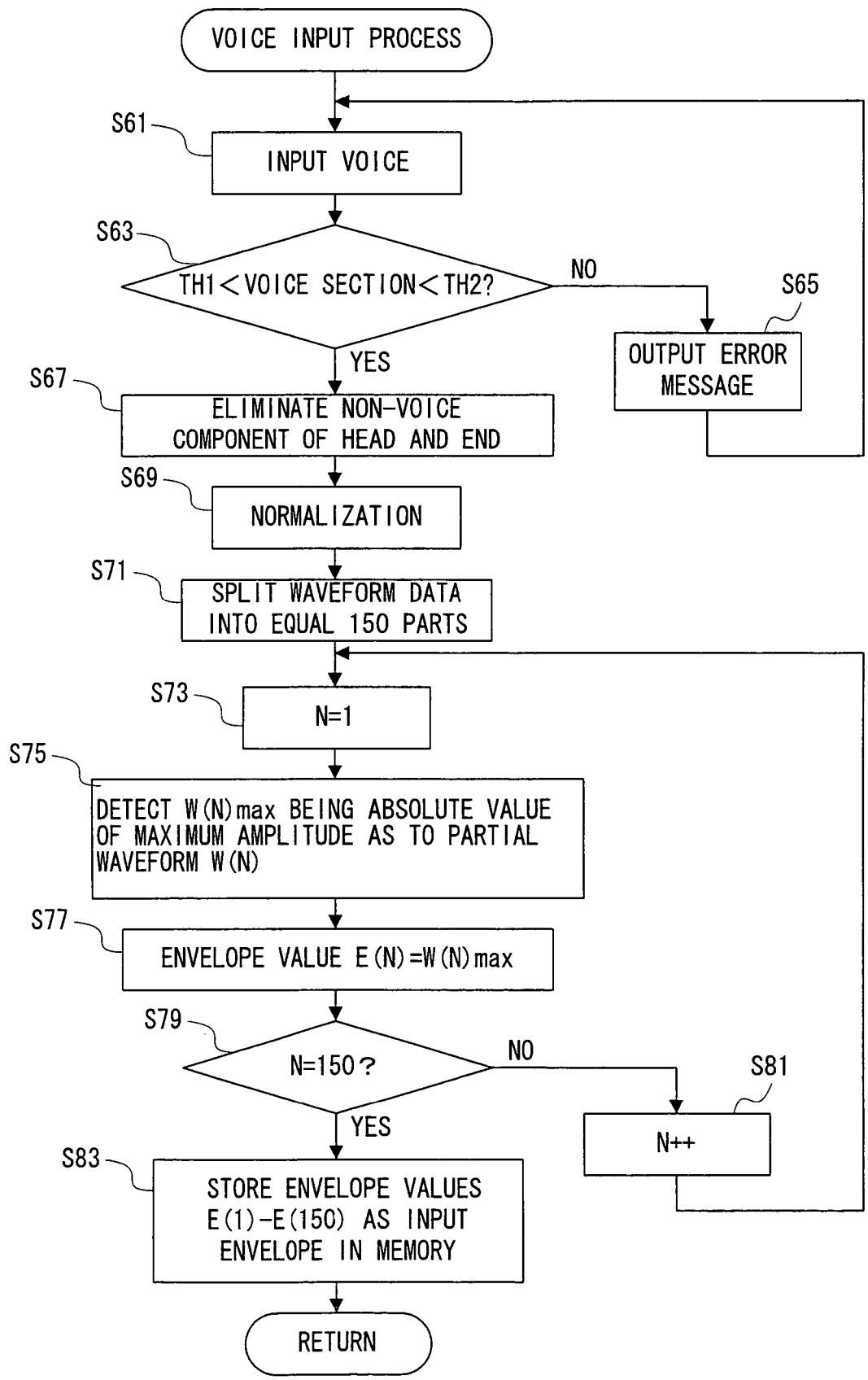
FIG. 8 is a flowchart showing a further part of the CPU core to be applied to FIG. 1 embodiment.
Figure 9:
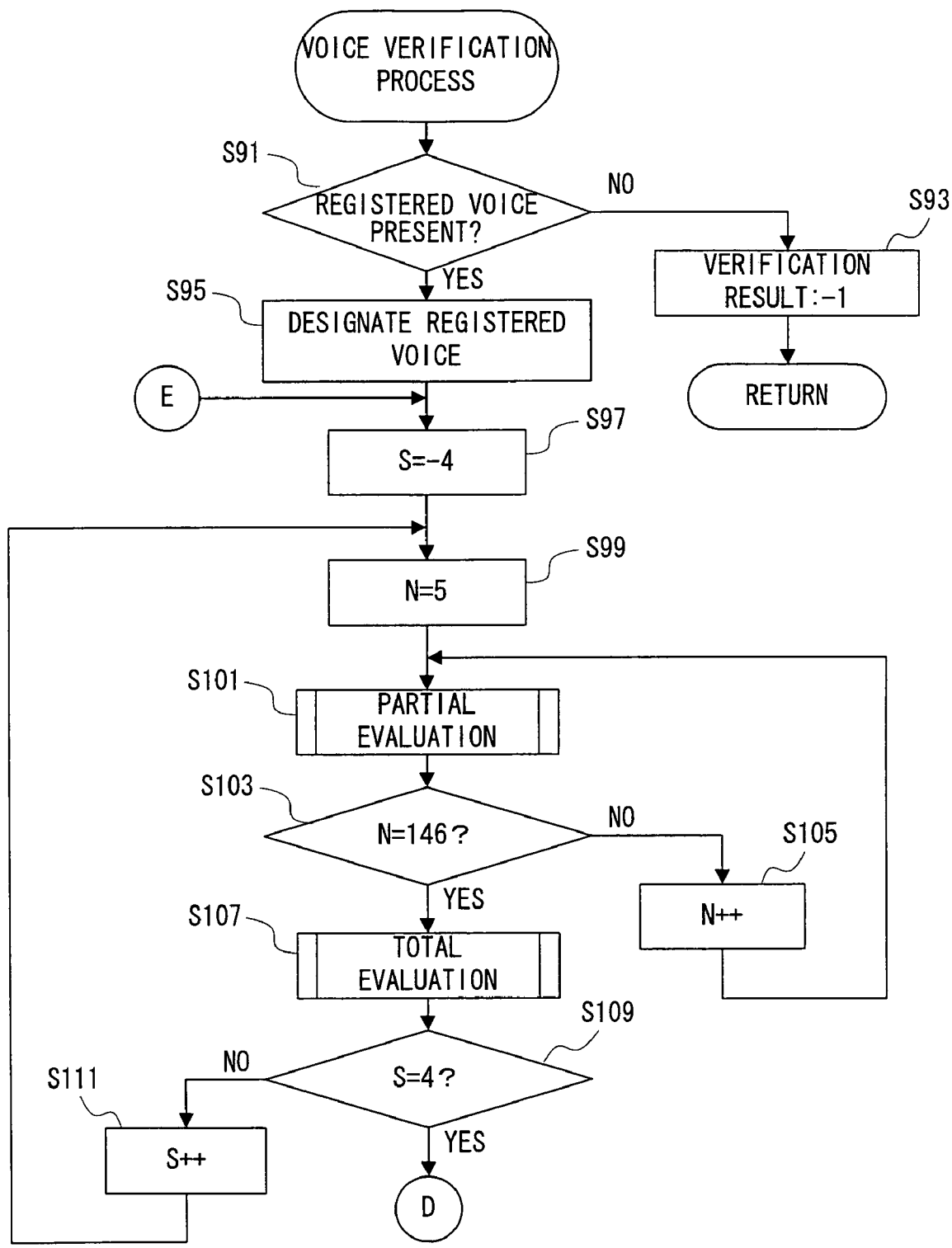
FIG. 9 is a flowchart showing another part of the CPU core to be applied to FIG. 1 embodiment.

The voice input process in the step S17 is executed according to the flowchart shown in FIG. 8. First, in a step S61, a voice command is input through the microphone 34. In a step S63, a voice section of an input voice command is determined. If a length of the voice section is equal to or less than a threshold value TH1, or is equal to or more than a threshold value TH2, an error message is output in a step S65, and then, the process returns to the step S61. On the contrary thereto, when the length of the voice section is above the threshold value TH1 and below the threshold value TH2, the process proceeds to a step S67 to eliminate a non-voice component from a head and an end of the waveform data representing the input voice command. In a step S69, the waveform data from which the non-voice component is eliminated is normalized, and in a succeeding step S71, the normalized waveform data is split into equal 150 parts.

Figure 14:
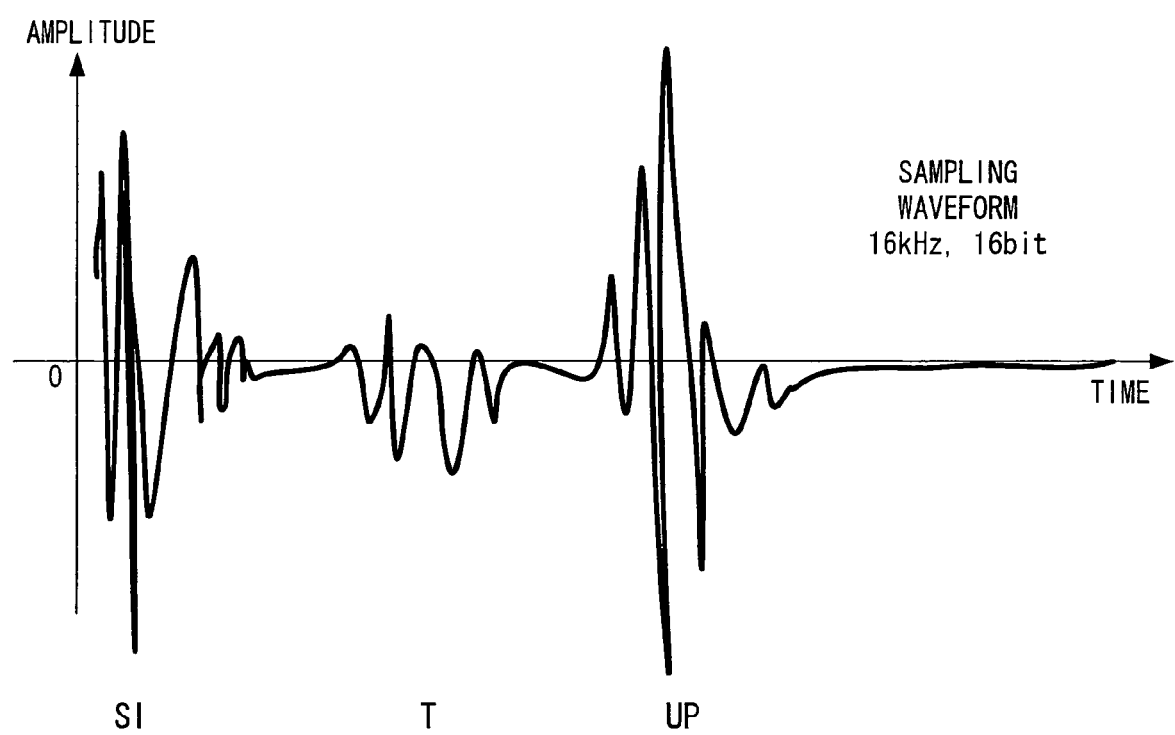
FIG. 14 is a graph showing a speech waveform of "sit-up"

When the voice command issued by the player is "sit up", waveform data shown in FIG. 14 is obtained by the process in the steps S67 and S69. The obtained waveform data is split into 150 partial waveforms W (1)-W (150) as shown in FIG. 15 by the process in the step S71.

In a step S73, "1" is set to a variable N. In a step S75, an absolute value W (N) max which is an absolute value of the maximum amplitude as to a partial waveform W (N) is detected (see FIG. 15), and in a step S77, the detected absolute value W (N) max is set as an envelope value E (N).

In a step S79, it is determined whether or not the variable N reaches "150". If "NO" here, the variable N is incremented in a step S81, and then, the process returns to the step S73. Thus, the absolute values W (1) max-W (150) max are respectively detected from the partial waveforms W (1)-W (150), and the detected absolute values W (1) max-W (150) max are respectively set as the envelope values E (1)-E (150).

Figure 15:
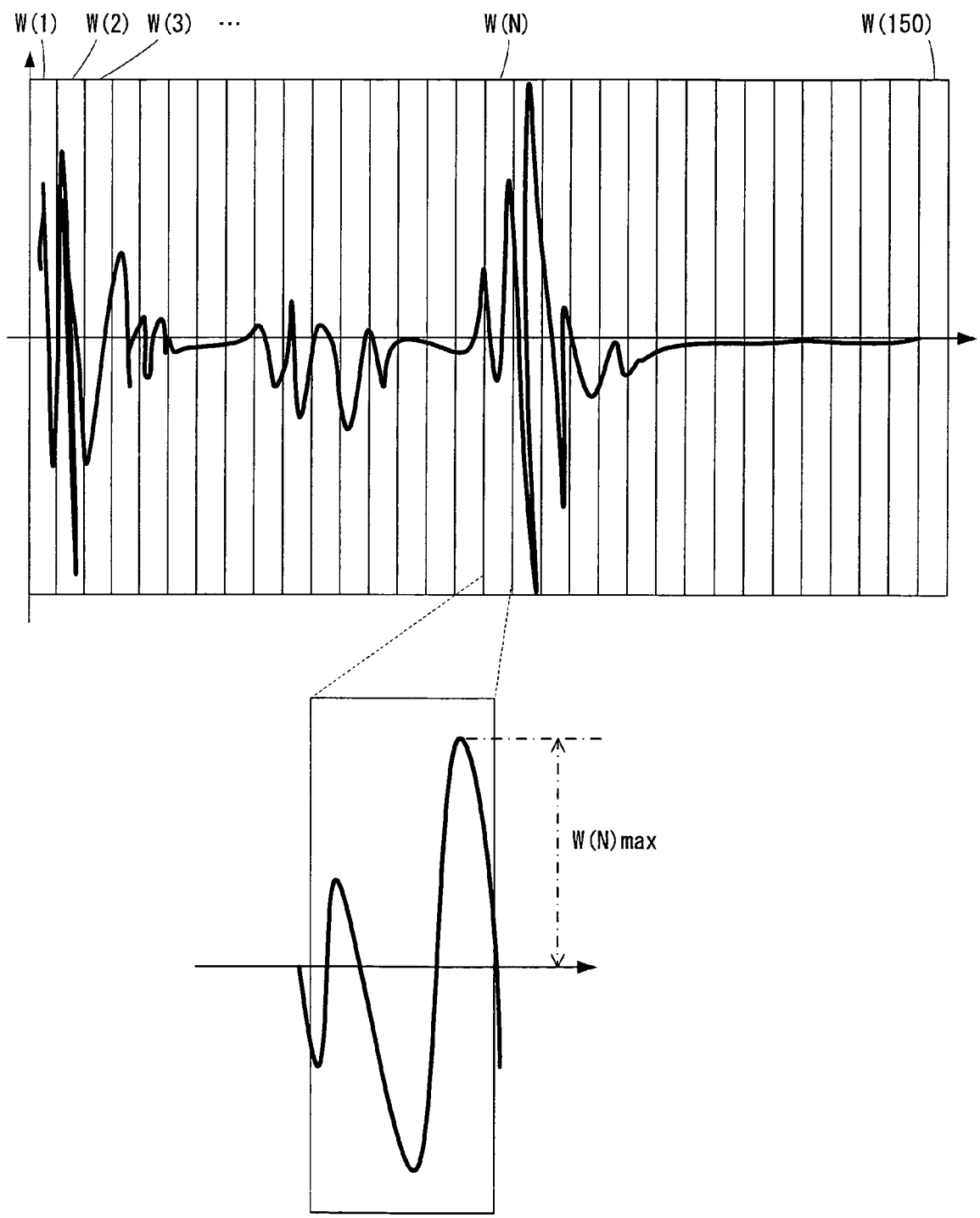
FIG. 15 is an illustrative view showing a part of an operation of the CPU core to be applied to FIG. 1 embodiment.
Figure 16:
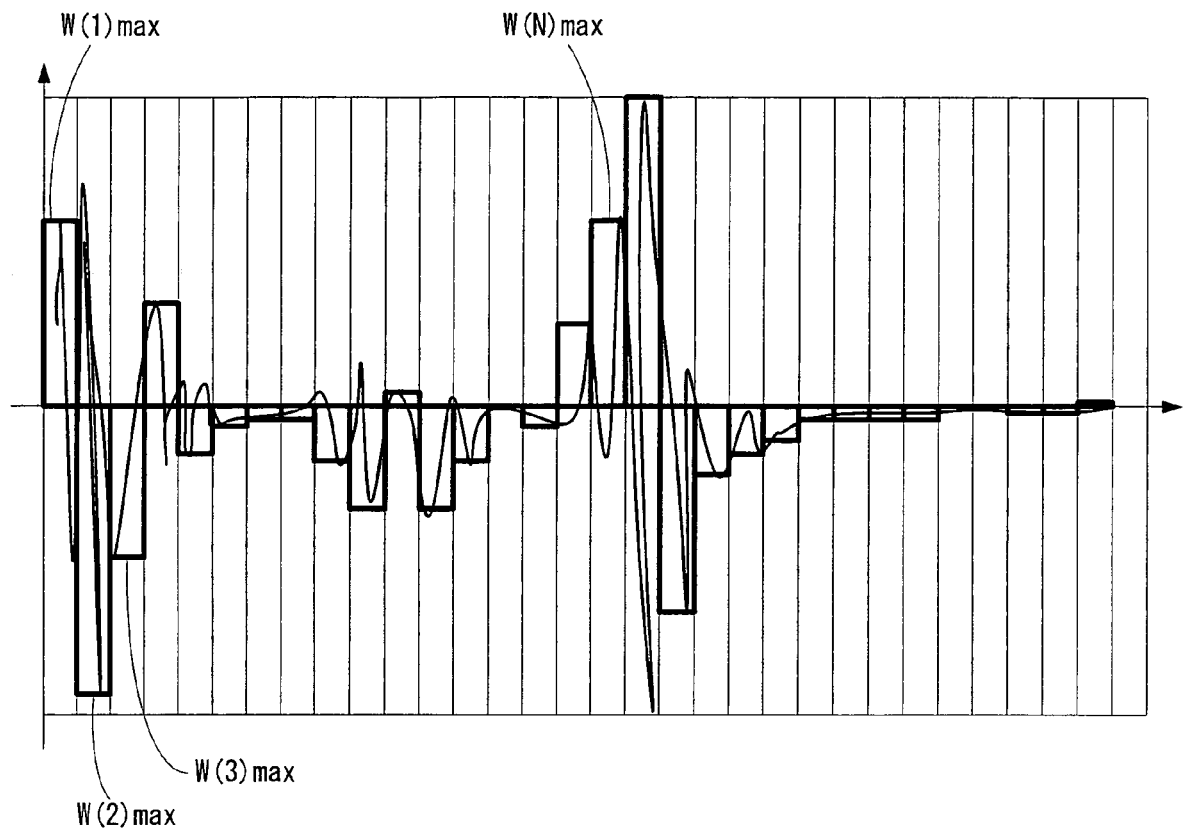
FIG. 16 is an illustrative view showing another part of the operation of the CPU core to be applied to FIG. 1 embodiment.
Figure 17:
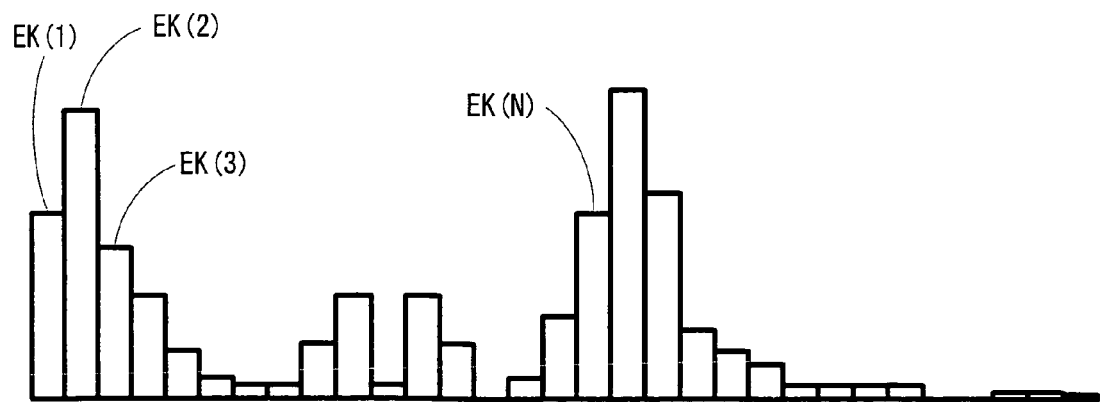
FIG. 17 is an illustrative view showing the other part of the operation of the CPU core to be applied to FIG. 1 embodiment.

As to the partial waveforms W (1)-W (150) shown in FIG. 15, the absolute values W (1) max-W (150) max are detected in a manner shown in FIG. 16, and set as the envelope values E (1)-E (150) as shown in FIG. 17.

If "YES" is determined in the step S79, the process proceeds to a step S83, and the envelope values E (1)-E (150) are assigned to the identification number for identifying a current display state. After completion of the storing process, the process is restored to the hierarchical upper level of the routine.

Figure 18:
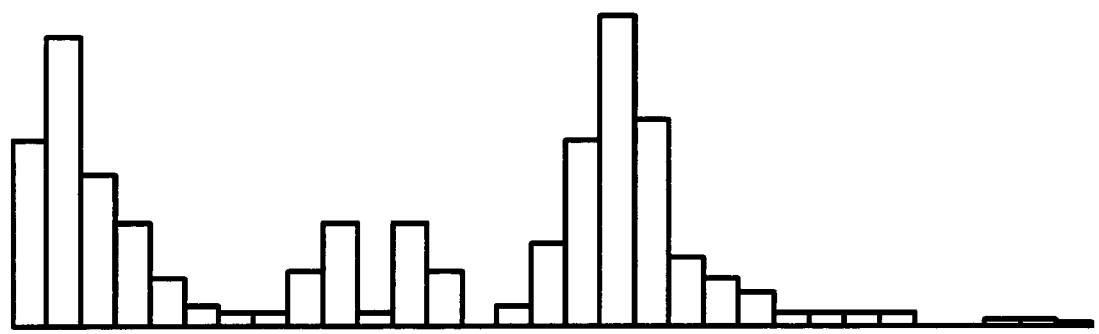
FIG. 18(A) is an illustrative view showing one example of a registered envelope corresponding to a voice command of "sit-up"
FIG. 18(B) is an illustrative view showing one example of the registered envelope corresponding to a voice command of "lie-down"
Figure 18:
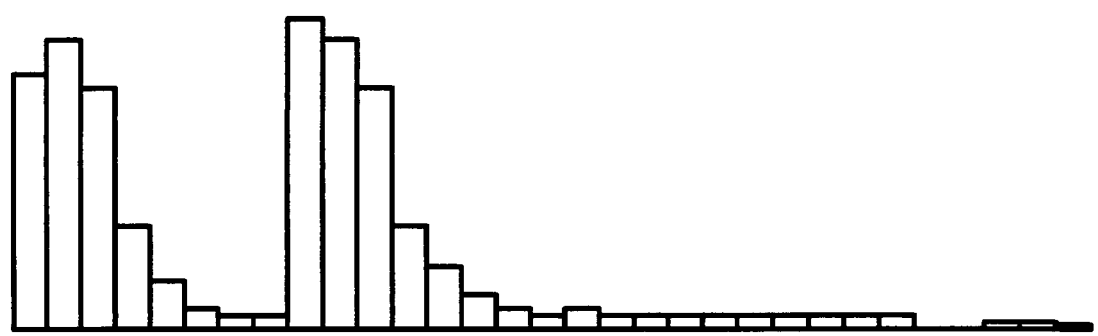

Additionally, the envelope values of "lie down" are changed as shown in FIG. 18(B) in comparison with the registered envelope of "shit up" shown in FIG. 18(A).

Figure 5:
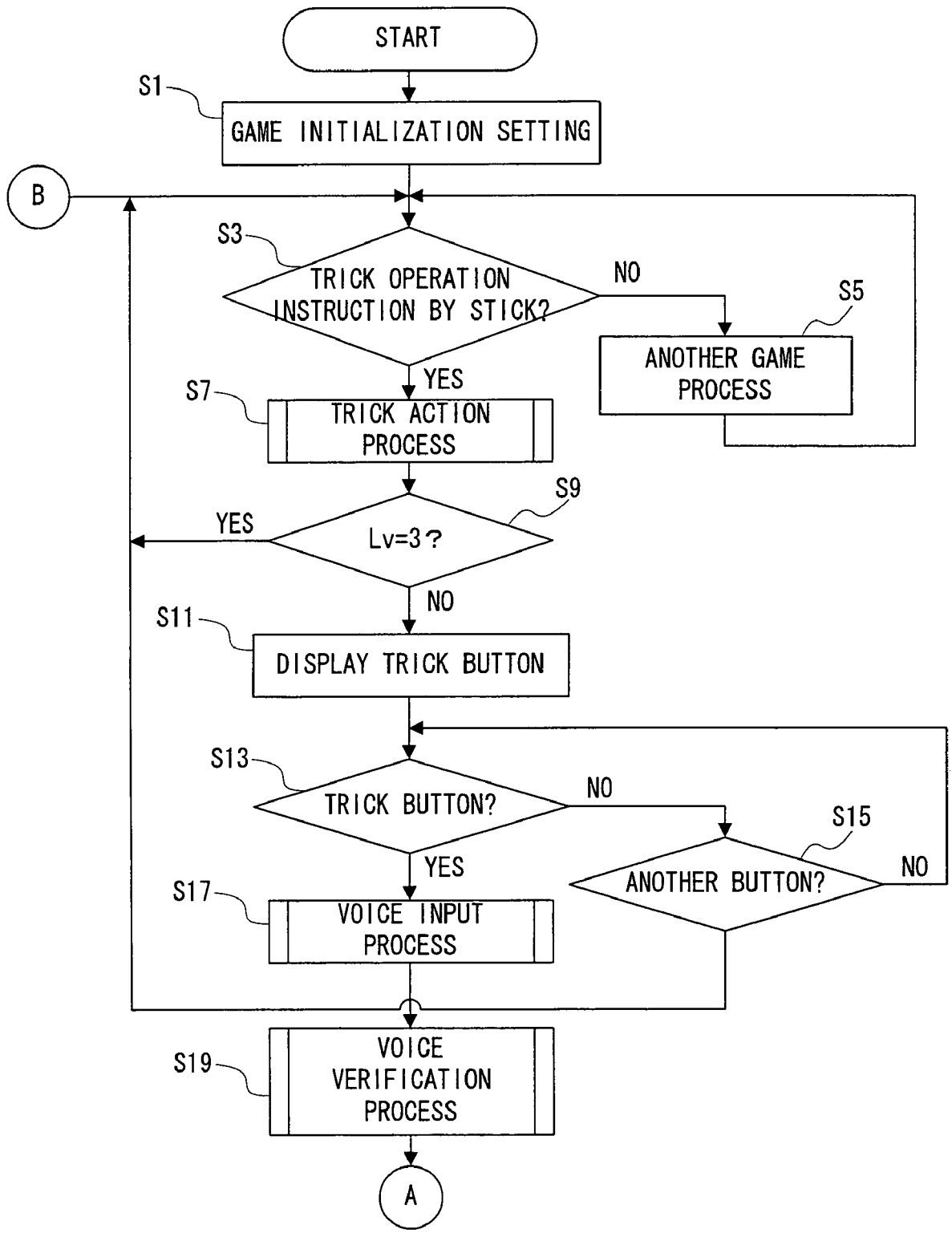
FIG. 5 is a flowchart showing a part of an operation of a CPU core to be applied to FIG. 1 embodiment.
Figure 6:
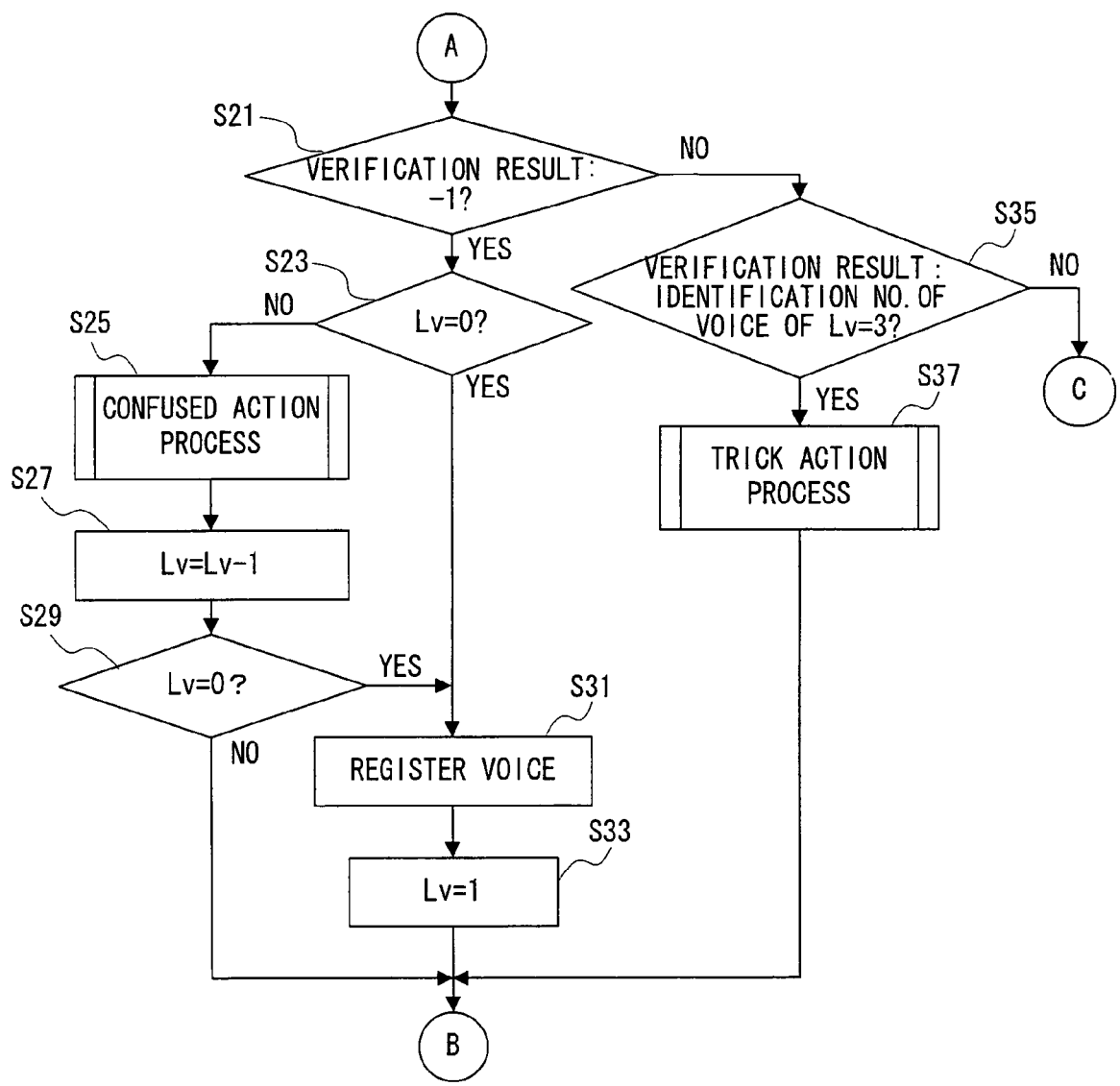
FIG. 6 is a flowchart showing another part of the CPU core to be applied to FIG. 1 embodiment.
Figure 7:
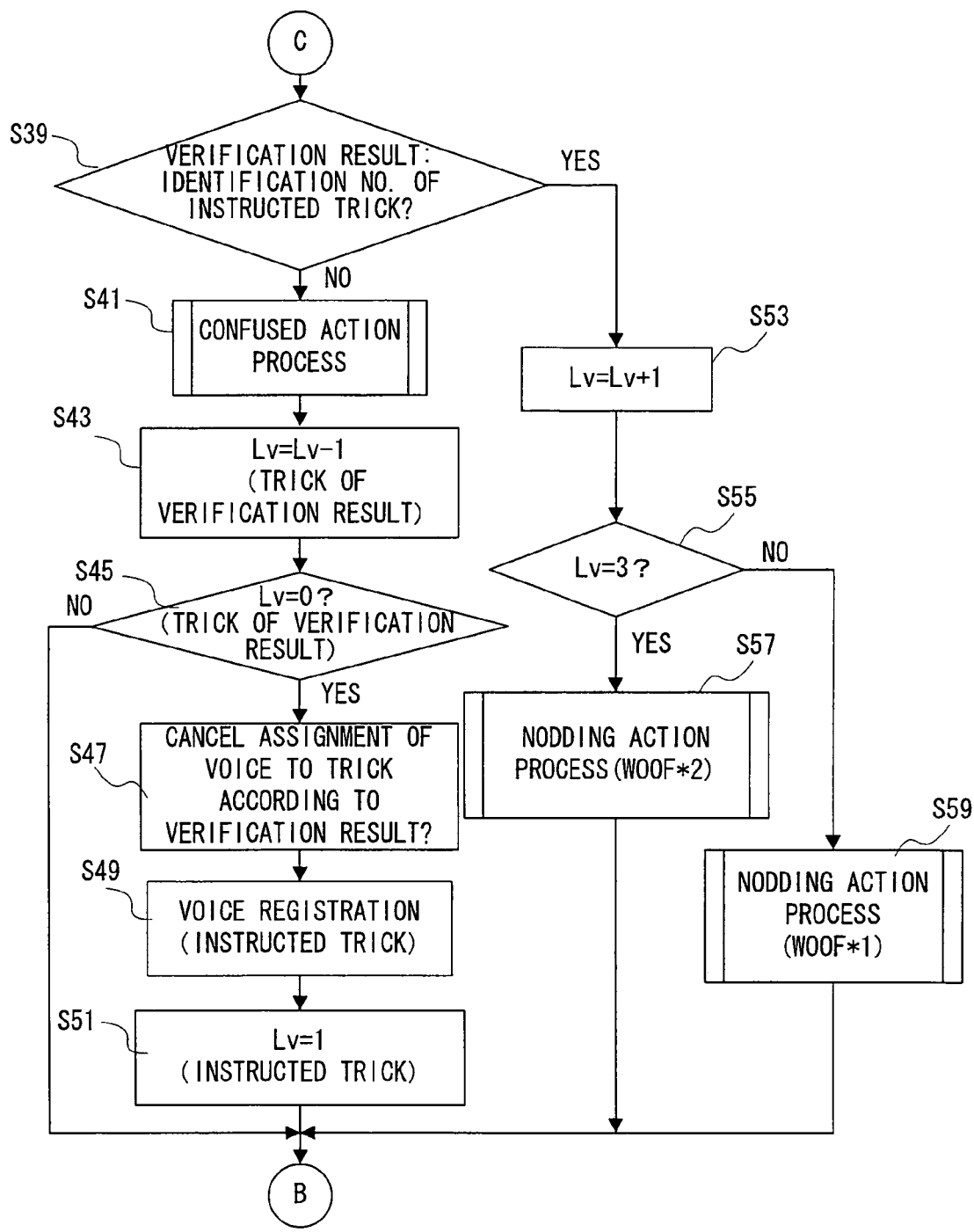
FIG. 7 is a flowchart showing the other part of the CPU core to be applied to FIG. 1 embodiment.

The voice verification process in a step S19 shown in FIG. 5 is executed according to the flowchart shown in FIG. 9-FIG. 12. First, in a step S91, it is determined whether or not the registered voice exists. If "NO" here, "−1" is determined as a verification result in a step S93, and if "YES", any one of the registered voices is designated in a step S95.

In a step S97, a variable S is set to "−4", and in a step S99, a variable N is set to "5". In a step S101, a difference between an envelope value EK (N) forming an envelope of the designated registered voice and an envelope value E (N+S) forming an envelope of the input voice is evaluated.

It is determined whether or not the variable N reaches "146" in a step S103, and if NO, the variable N is incremented in a step S105, and then, the process returns to the step S101.

Consequently, the partial evaluation process in a step S107 is repeated at 142 times, and a total of 142 partial evaluated values are obtained.

In the step S107, the partial evaluated values of 142 is totally evaluated, and in a step S109, it is determined whether or not a variable S reaches "4". If the variable S is less than "4", the variable S is incremented in a step S111, and then, the process returns to the step S99. As a result, a series of process in the step S99-S109 is repeated at nine times, and nine total evaluated values are obtained. In a step S113, a total evaluated value having a maximum numerical value is specified from among the nine evaluated values.

It is noted that the reason why the value to be taken as the variable N in the partial evaluation process is limited to the "5"-"146" range in the partial evaluation process is that the variable S is changed within the "−4"-"4" range. That is, a range to be taken by the variable N is limited such that a correspondence of the envelope of the registered voice to the envelope of the input voice is sure to be maintained.

Figure 19:
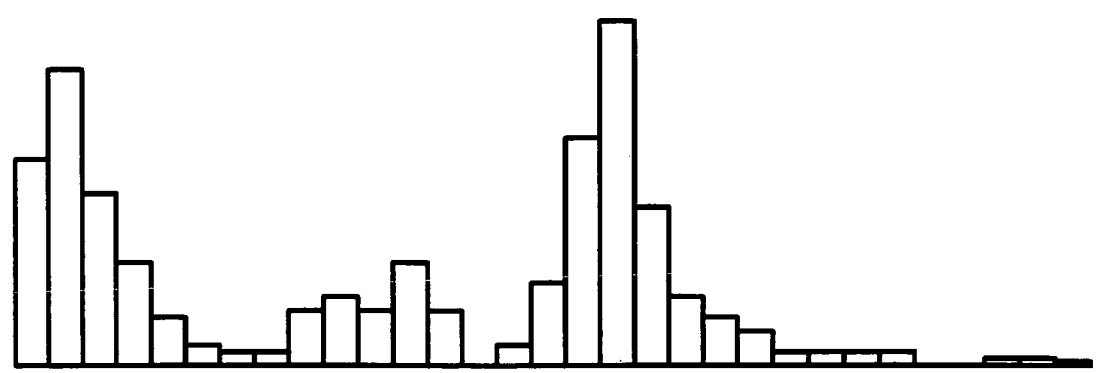
FIG. 19 is an illustrative view showing one example of an input envelope of the voice command of "sit-up"
Figure 20:
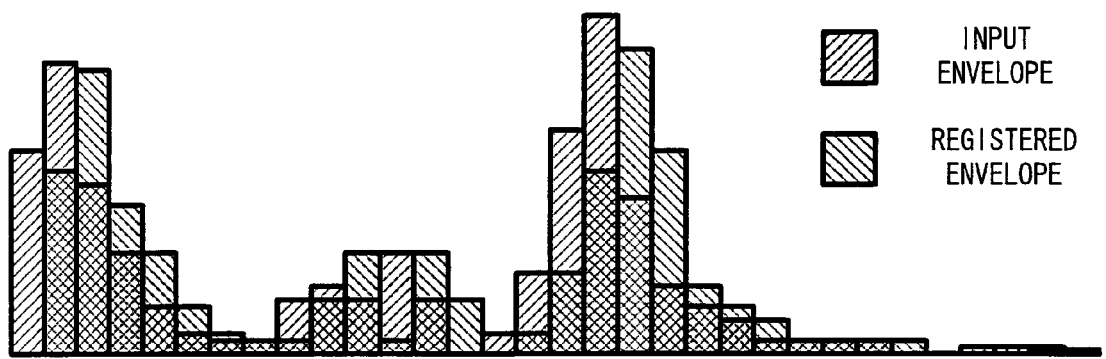
FIG. 20(A) is an illustrative view showing one example of a verification operation between the input envelope and the registered envelope.
FIG. 20(B) is an illustrative view showing another example of the verification operation between the input envelope and the registered envelope.
FIG. 20(C) is an illustrative view showing the other example of the verification operation between the input envelope and the registered envelope.
Figure 20:
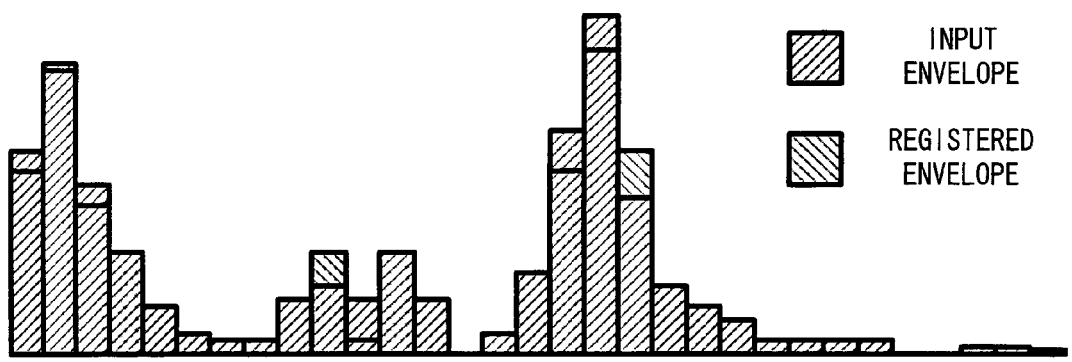
Figure 20:
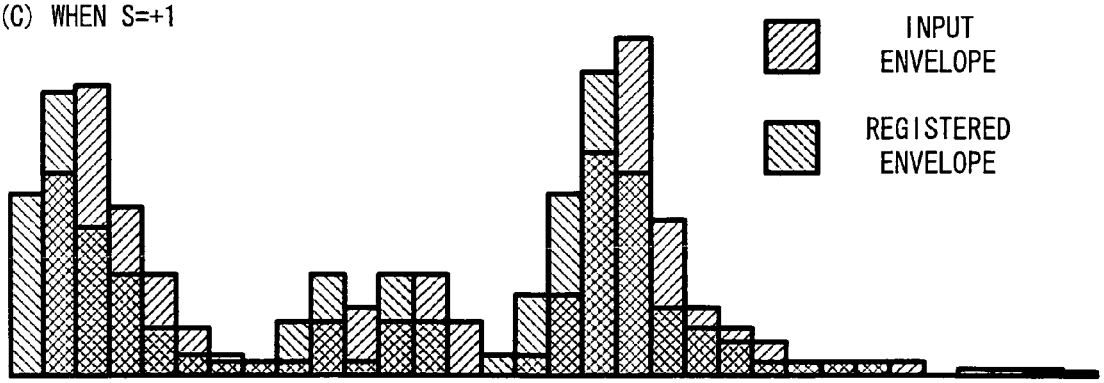

In a case that the input voice of "sit up" shown in FIG. 19 is compared with the registered voice of "sit up" shown in FIG. 18(A), when the variable S is "−1", a difference between the input voice and the registered voice is evaluated in a manner shown in FIG. 20(A), and when the variable S is "0", the difference between the input voice and the registered voice is evaluated in a manner shown in FIG. 20(B), and when the variable S is "+1", the difference between the input voice and the registered voice is evaluated in a manner shown in FIG. 20(C).

In a step S115, it is determined whether or not a comparison with all the registered voices is completed, and if "NO", designation of the registered voice is updated in the step S103, and then, the process returns to the step S94. Consequently, total evaluated values corresponding to the registered voice in number can be obtained.

A total evaluated value having the maximum evaluated value is detected out of total evaluated values thus obtained in a step S119. In a step S121, it is determined whether or not the detected total evaluated value is above a defined value. If "YES" here, the process proceeds to a step S123 to determine the identification number of the registered voice corresponding to the detected total evaluated value as a verification result. On the other hand, If "NO" in the step S121, the process proceeds to a step S125 to determine "−1" as a verification result similar to the above-described step S93. After completion of the process in the step S123 or S125, the process is restored to the hierarchical upper level of the routine.

Figure 10:
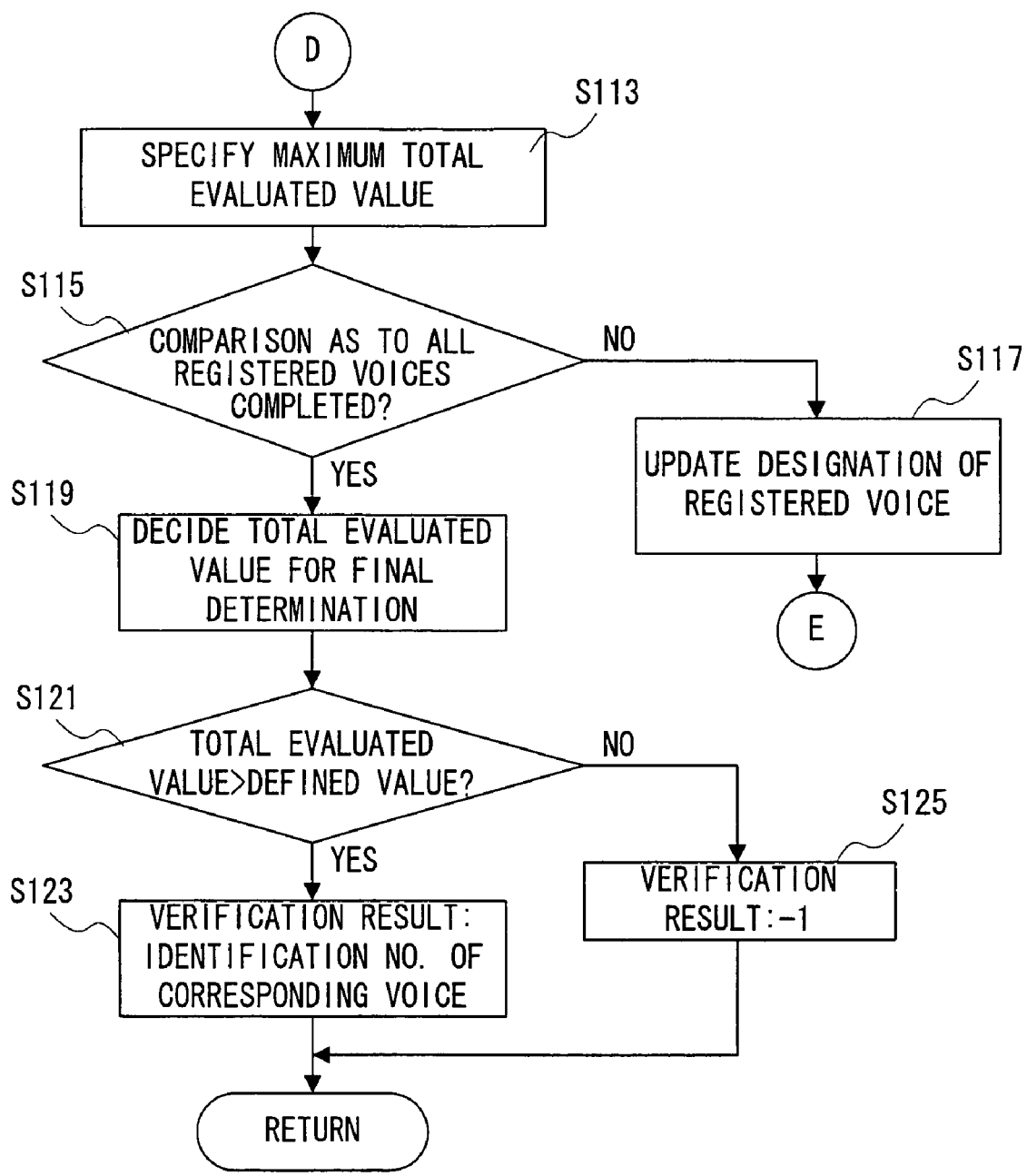
FIG. 10 is a flowchart showing the other part of the CPU core to be applied to FIG. 1 embodiment.

The partial evaluation process in the step S101 shown in FIG. 8 is executed according to a flowchart shown in FIG. 10. First, it is determined whether or not the variable N is "1" in a step S131. If "NO" here, the process directly proceeds to a step S135 while if "YES", "0" is set to the variables X1 and X2 in a step S133, and then, the process proceeds to the step S135. In the step S135, a threshold value TH (N) is calculated. The larger the envelope value EK (N) is, the larger the threshold value TH (N) is.

In a step S137, a difference absolute value |EK (N)-E (N+S)| which is a difference absolute value between the envelope values EK (N) and E (N+S) is compared to the threshold value TH (N). Here, if the difference absolute value |EK (N)-E (N+S)| is equal to or more than the threshold value TH (N), the process is directly restored to the hierarchical upper level of the routine. On the other hand, if the difference absolute value |EK (N)-E (N+S)| is less than the threshold value TH (N), the variable X1 is incremented in a step S139, and it is determined whether or not the variable N is above "1" in a step S141.

If "NO" in the step S141, the process is directly restored to the hierarchical upper level of the routine. If "YES" in the step S141, the process proceeds to a step S143 to compare a difference absolute value |EK (N−1)-E (N+S−1)| which is a difference absolute value between the envelope values EK (N−1) and E (N+S−1) to the threshold value TH (N−1). Then, if the difference absolute value |EK (N−1)-E (N+S−1)| is equal to or more than the threshold value TH (N−1), the process is restored to the hierarchical upper level of the routine. On the other hand, if the difference absolute value |EK (N−1)-E (N+S−1)| is less than the threshold value TH (N−1), the variable X2 is incremented in a step S145, and then, the process is directly restored to the hierarchical upper level of the routine.

By repeating the process at 142 times, the variable X1 indicates the number of the partial waveforms having approximately the same envelope value between the registered voice and the input voice, and the variable X2 indicates the number of partial waveforms having approximately the same envelope value as to the adjacent partial waveforms.

Figure 11:
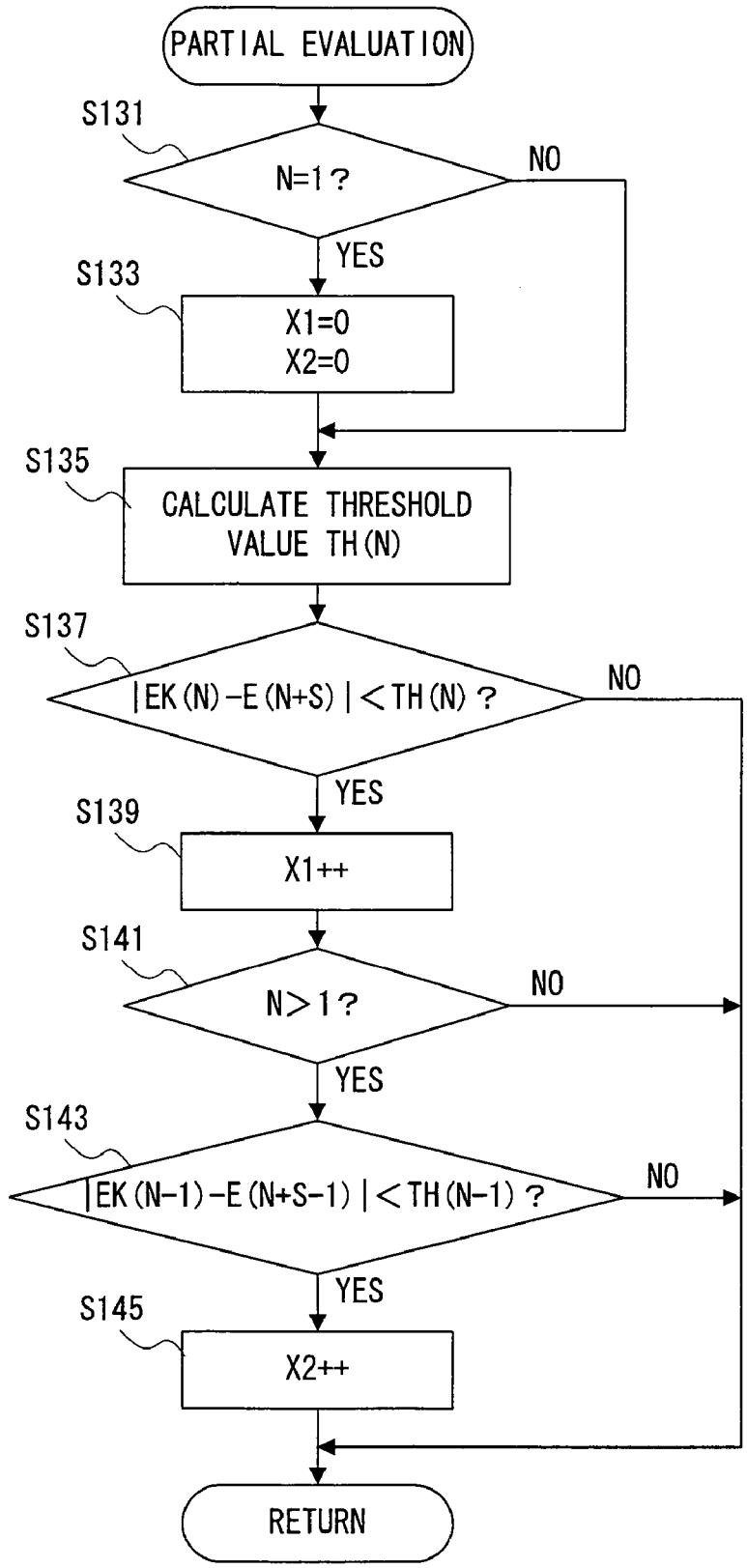
FIG. 11 is a flowchart showing a further part of the CPU core to be applied to FIG. 1 embodiment.
Figure 12:
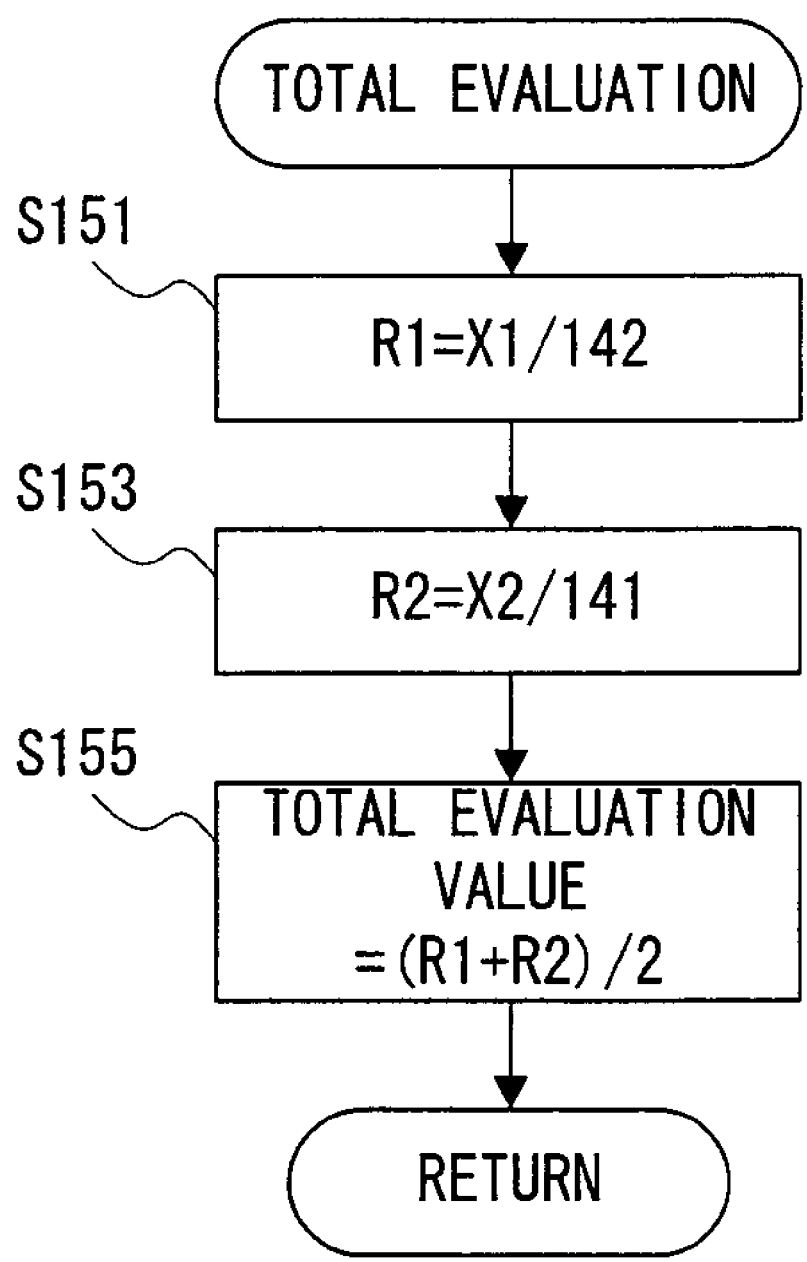
FIG. 12 is a flowchart showing another part of the CPU core to be applied to FIG. 1 embodiment.

The total evaluation process in the step S107 shown in FIG. 8 is executed according to a flowchart shown in FIG. 11. In a step S151, the variable X1 is divided by "142" to acquire a coefficient R1, and in a step S153, the variable X2 is divided by "141" to acquire a coefficient R2. The coefficient R1 indicates a ratio of the partial waveforms having approximately the same envelope value between the registered voice and the input voice, and the coefficient R2 indicates a ratio of the partial waveforms having approximately the same envelope value as to the adjacent partial waveforms also. In a step S155, an average value between the coefficients R1 and R2 is calculated as a total evaluation value, and after completion of the calculation process, the process is restored to the hierarchical upper level of the routine.

As can be understood from the above description, a trick action instruction based on the operation input set in advance to the dog object DG is accepted in the step S3. The trick action corresponding to the accepted trick action instruction is required to the object in the step S7. An arbitrary voice is taken in association with the request process in the step S7 in the step S17. The voice command coincident with the taken voice is searched among the registered voices by the voice verification process in the step S19.

If the verification process fails, the verification result indicates "−1". The taken voice command is assigned to the trick to be executed by the display control of the object in the step S7 by the process in the step S31.

On the other hand, if the voice command found by the verification process is the voice command assigned to the trick executed in the step S7, the degree of relation Lv assigned to the trick to be executed is incremented in the step S53. The dog object DG performs a different nodding action depending on the degree of relation Lv.

Accordingly, when a manual trick action instruction is issued in response to the operation input in order to bring the voice input into correspondence with the action display control of the object determined in advance (that is, to teach the dog object DG to do tricks), the dog object DG executes a trick according to the instruction. Here, when an arbitrary voice command is issued, the voice command is assigned to the executed trick. When the same trick action instruction is issued again and the same voice command is issued again as to execution of the trick by the object, the degree of relation Lv between the executed trick and the issued voice command is increased. A movement of the dog object DG, that is, an output message is changed as the degree of relation Lv is increased. The change of the output message allows the player to enjoy a series of operation for teaching the dog object DG to do the trick.

It is noted that although the number of the registered voice (unspecified registered voice) having the degree of relation Lv indicating "1" or "2" is not limited in this embodiment, it is also appropriate that the upper limit of the unspecified registered voice is "5", for example, and the oldest unspecified registered voice is erased in response to registration of the sixth input voice.

Furthermore, although it is assumed that the trick is taught to the object in this embodiment, it is needless to say that an action except for the trick can be taught to the object.

It is noted that the present embodiment is for performing the above-described simple process considering the fact that there is no need to completely analyze the voice in a game such as an action game that is restricted in command, that is, the game restricted in command does not need a process at a large load such as specifying a word indicated by the input voices by analyzing distribution of the frequency.

It is noted that although the LCDs 12 and 14 are vertically arranged in the above-described embodiment, the arrangement of the two LCDs may be changed as necessary. That is, the LCDs 12 and 14 may horizontally be arranged.

Furthermore, although two LCDs each displaying a screen are provided in the above-described embodiment, the number of the LCDs as a display portion may be changed as necessary. That is, it is appropriate that one LCD in the longitudinal shape is provided, and by vertically dividing the area, the touch panel 22 is provided on one side of the area. Thus, it is possible to display two images on the respective areas. Or, it is appropriate that one LCD in the transverse shape is provided, and by horizontally dividing the area, the touch panel 22 is provided on one side of the area. Thus, it is possible to display two images on the respective areas.

Although the example embodiment presented herein has been described and illustrated in detail, it is clearly understood that the same is by way of illustration and example only and is not to be taken by way of limitation, the spirit and scope of the example embodiment being limited only by the terms of the appended claims.

What is claimed is:

1. An image processing apparatus having a display screen for displaying an object, comprising:
    image displaying programmed logic circuitry for displaying an object on said display screen;
    designating programmed logic circuitry for designating an arbitrary position within said display screen;
    accepting programmed logic circuitry for accepting an action instruction directed to said object based upon a designation from said designating programmed logic circuitry;
    first requesting programmed logic circuitry for requesting said object to perform an action corresponding to the action instruction accepted by said accepting programmed logic circuitry;
    fetching programmed logic circuitry for fetching an arbitrary voice command in association with the request by said first requesting programmed logic circuitry;
    retrieving programmed logic circuitry for retrieving a voice command being coincident with the voice command fetched by said fetching programmed logic circuitry from among the voice commands which are assigned to actions of said object;
    first assigning programmed logic circuitry for assigning the voice command fetched by said fetching programmed logic circuitry to the action according to the request by said first requesting programmed logic circuitry when said retrieving programmed logic circuitry fails in the retrieving process;
    increasing programmed logic circuitry for increasing a degree of relation indicating a highness in relevance between the action according to the request by said first requesting programmed logic circuitry and the voice command fetched by said fetching programmed logic circuitry when the voice command retrieved by said retrieving programmed logic circuitry is the voice command which is assigned to the action according to the request by said first requesting programmed logic circuitry; and
    first display programmed logic circuitry for displaying said object in a different manner depending on a level achieved by the degree of relation increased by said increasing programmed logic circuitry.

2. An image processing apparatus according to claim 1, further comprising a second requesting programmed logic circuitry for requesting said object to perform an action corresponding to the voice command.

3. An image processing apparatus according to claim 1, further comprising disabling programmed logic circuitry for disabling said fetching programmed logic circuitry when the degree of relation corresponding to the action according to the request by said first requesting programmed logic circuitry satisfies a condition.

4. An image processing apparatus according to claim 3, wherein said increasing programmed logic circuitry increases a numerical value indicating said degree of relation, and said disabling programmed logic circuitry disables said fetching programmed logic circuitry when the numerical value indicating said degree of relation reaches a threshold value.

5. An image processing apparatus according to claim 1, further comprising:
    determining programmed logic circuitry for determining whether or not the degree of relation corresponding to the action according to the request by said first requesting programmed logic circuitry indicates a default value when said retrieving programmed logic circuitry fails in the retrieving process; and
    first decreasing programmed logic circuitry for decreasing the degree of relation noted by said determining programmed logic circuitry when the determination result by said determining programmed logic circuitry is negative, wherein said first assigning programmed logic circuitry suspends the assignment operation when the degree of relation noted by said determining programmed logic circuitry is larger than said default value.

6. An image processing apparatus according to claim 1, further comprising:
    second decreasing programmed logic circuitry for decreasing the degree of relation corresponding to the voice command retrieved by said retrieving programmed logic circuitry when said voice command retrieved by said retrieving programmed logic circuitry is different from the voice command assigned to the action according to the request by said first requesting programmed logic circuitry; and
    second assigning programmed logic circuitry for assigning the voice command fetched by said fetching programmed logic circuitry to the action according to the request by said first requesting programmed logic circuitry in place of the voice command retrieved by said retrieving programmed logic circuitry when the degree of relation decreased by said second decreasing programmed logic circuitry indicates the default value.

7. An image processing apparatus according to claim 5, further comprising second display programmed logic circuitry for displaying a message as to the decrease of said degree of relation.

8. A recording medium which records an image processing program to be executed by a processor of an image processing apparatus having a display screen for displaying an object, wherein said image processing program comprises:
- an image displaying instruction for displaying an object on said display screen;
- a designating instruction for designating an arbitrary position within said display screen;
- an accepting instruction for accepting a manual action instruction directed to said object based upon a designation of the arbitrary position within the display screen;
- a first requesting instruction for requesting said object to perform an action corresponding to the action instruction accepted by said accepting instruction;
- a fetching instruction for fetching an arbitrary voice command in association with the request by said first requesting instruction;
- a retrieving instruction for retrieving a voice command being coincident with the voice command fetched by said fetching instruction from among the voice commands which are assigned to actions of said object;
- a first assigning instruction for assigning the voice command fetched by said fetching instruction to the action according to the request by said first requesting instruction when said retrieving instruction fails in the retrieving process;
- an increasing instruction for increasing a degree of relation indicating a highness in relevance between the action according to the request by said first requesting instruction and the voice command fetched by said fetching instruction when the voice command retrieved by said retrieving instruction is the voice command which is assigned to the action according to the request by said first requesting instruction; and
- a first display instruction for displaying said object in a different manner depending on a level achieved by the degree of relation increased by said increasing instruction.

9. A recording medium according to claim 8, wherein said image processing program further comprises a second requesting instruction for requesting said object to perform an action corresponding to the voice command.

10. A recording medium according to claim 8, wherein said image processing program further comprises a disabling instruction for disabling said fetching instruction when the degree of relation corresponding to the action according to the request by said first requesting instruction satisfies a condition.

11. A recording medium according to claim 10, wherein said increasing instruction increases a numerical value indicating said degree of relation, and said disabling instruction disables said fetching instruction when the numerical value indicating said degree of relation reaches a threshold value.

12. A recording medium according to claim 8, wherein said image processing program further comprises:
- a determining instruction for determining whether or not the degree of relation corresponding to the action according to the request by said first requesting instruction indicates a default value when said retrieving instruction fails in the retrieving instruction; and
- a first decreasing instruction for decreasing the degree of relation noted by said determining instruction when a determination result by said determining instruction is negative, wherein said first assigning instruction suspends the assignment operation when the degree of relation noted by said determining instruction is larger than said default value.

13. A recording medium according to claim 8, wherein said image processing program further comprises:
- a second decreasing instruction for decreasing the degree of relation corresponding to the voice command retrieved by said retrieving instruction when said voice command retrieved by said retrieving instruction is different from the voice command assigned to the action according to the request by said first requesting instruction; and
- a second assigning instruction for assigning the voice command fetched by said fetching instruction to the action according to the request by said first requesting instruction in place of the voice command retrieved by said retrieving instruction when the degree of relation decreased by said second decreasing instruction indicates the default value.

14. A recording medium according to claim 12, wherein said image processing program further comprises a second display instruction for displaying a message as to the decrease of said degree of relation.

15. A command processing apparatus, comprising:
- accepting programmed logic circuitry for accepting a manual action instruction directed to an object;
- first requesting programmed logic circuitry for requesting said object to perform an action corresponding to the action instruction accepted by said accepting programmed logic circuitry;
- fetching programmed logic circuitry for fetching an arbitrary voice command in association with the request by said first requesting programmed logic circuitry;
- retrieving programmed logic circuitry for retrieving a voice command being coincident with the voice command fetched by said fetching programmed logic circuitry from among the voice commands which are assigned to actions of said object;
- first assigning programmed logic circuitry for assigning the voice command fetched by said fetching programmed logic circuitry to the action according to the request by said first requesting programmed logic circuitry when said retrieving programmed logic circuitry fails in the retrieving process;
- increasing programmed logic circuitry for increasing a degree of relation indicating a highness in relevance between the action according to the request by said first requesting programmed logic circuitry and the voice command fetched by said fetching programmed logic circuitry when the voice command retrieved by said retrieving programmed logic circuitry is the voice command which is assigned to the action according to the request by said first requesting programmed logic circuitry;
- first output programmed logic circuitry for outputting a different message depending on a level achieved by the degree of relation increased by said increasing programmed logic circuitry,
- determining programmed logic circuitry for determining whether or not the degree of relation corresponding to the action according to the request by said first requesting programmed logic circuitry indicates a default value when said retrieving programmed logic circuitry fails in the retrieving process; and first decreasing programmed logic circuitry for decreasing the degree of relation noted by said determining programmed logic circuitry when the determination result by said determining programmed logic circuitry is negative, wherein said first assigning programmed logic circuitry suspends the assignment operation when the degree of relation noted by said determining programmed logic circuitry is larger than said default value.

16. A recording medium which records a game program to be executed by a processor of a command processing apparatus, wherein said game program comprises:

an accepting instruction for accepting a manual action instruction directed to an object;

a first requesting instruction for requesting said object to perform an action corresponding to the action instruction accepted by said accepting instruction;

a fetching instruction for fetching an arbitrary voice command in association with the request by said first requesting instruction;

a retrieving instruction for retrieving a voice command being coincident with the voice command fetched by said fetching instruction from among the voice commands which are assigned to actions of said object;

a first assigning instruction for assigning the voice command fetched by said fetching instruction to the action according to the request by said first requesting instruction when said retrieving instruction fails in the retrieving process;

an increasing instruction for increasing a degree of relation indicating a highness in relevance between the action according to the request by said first requesting instruction and the voice command fetched by said fetching instruction when the voice command retrieved by said retrieving instruction is the voice command which is assigned to the action according to the request by said first requesting instruction;

a first output instruction for outputting a different message depending on a level achieved by the degree of relation increased by said increasing instruction, a determining instruction for determining whether or not the degree of relation corresponding to the action according to the request by said first requesting instruction indicates a default value when said retrieving instruction fails in the retrieving process; and a first decreasing instruction for decreasing the degree of relation noted by said determining instruction when a determination result by said determining instruction is negative, wherein said first assigning instruction suspends the assignment operation when the degree of relation noted by said determining instruction is larger than said default value.

* * * * *